US012564940B2

(12) United States Patent
Katz et al.

(10) Patent No.: US 12,564,940 B2
(45) Date of Patent: Mar. 3, 2026

(54) SCREW ACTUATOR

(71) Applicant: Boston Dynamics, Inc., Waltham, MA (US)

(72) Inventors: Benjamin G. Katz, Lincoln, MA (US); Joao Luiz Almeida de Souza Ramos, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 18/541,267

(22) Filed: Dec. 15, 2023

(65) Prior Publication Data

US 2025/0196326 A1      Jun. 19, 2025

(51) Int. Cl.
B25J 9/12          (2006.01)
B25J 9/10          (2006.01)

(52) U.S. Cl.
CPC .............. B25J 9/123 (2013.01); B25J 9/102 (2013.01)

(58) Field of Classification Search
CPC . B25J 9/123; B25J 9/102; F16H 25/20; F16H 2025/204; F16H 2025/2075; F16H 2025/2078; F16H 2025/2081; F16H 25/2021
USPC .............................. 74/89.23, 424.71, 490.03
See application file for complete search history.

(56) References Cited

U.S. PATENT DOCUMENTS 5,740,699 A      4/1998  Ballantyne et al.
6,603,228 B1 *  8/2003  Sato ..................... B23K 11/318
                                                    310/12.32
9,017,419 B1 *  4/2015  Landry ................... H02K 7/06
                                                    310/156.01
12,181,027 B2 * 12/2024 Knoell ................... H02K 7/083
2012/0160043 A1 * 6/2012 Drumm .................... H02K 7/06
                                                    74/89.23

(Continued)

FOREIGN PATENT DOCUMENTS

CN      110228545  A  *  9/2019  ........... B62D 57/032
DE      4237385  A1  *  5/1994  ............. H02K 7/108

(Continued)

OTHER PUBLICATIONS

Gasparis Schotti, Technica Curiosa, sive Mirabilia Artis, Libris XII. . . . [Curious works of skill, or marvelous works of craftsmanship] (Nuremberg (Norimberga), (Germany): Johannes Andreas Endter & Wolfgang Endter, 1664), Plate 7, Figure 32 (Year: 1664).*

(Continued)

*Primary Examiner* — T. Scott Fix
(74) *Attorney, Agent, or Firm* — Pierce Atwood LLP

(57)          ABSTRACT

The invention includes a screw actuator. The screw actuator includes a screw having a screw shaft and a screw nut. The screw shaft defines a first longitudinal axis along its length. The screw nut at least partially surrounds the screw shaft. The screw actuator includes a motor having a stator and a rotor. The rotor is mechanically coupled to the screw shaft. The stator at least partially surrounds the rotor. The screw actuator includes a first rigid member having a length dimension oriented along the first longitudinal axis. The screw actuator includes a second rigid member mechanically constrained relative to the first rigid member. The second rigid member is configured to move along a direction of the first longitudinal axis.

21 Claims, 23 Drawing Sheets

(56) References Cited

U.S. PATENT DOCUMENTS

| | | | |
|---|---|---|---|
| 2020/0361101 A1 | 11/2020 | Zhang et al. | |
| 2021/0252697 A1 | 8/2021 | Webb | |
| 2022/0003297 A1 | 1/2022 | Potter et al. | |

FOREIGN PATENT DOCUMENTS

| | | | | |
|---|---|---|---|---|
| EP | 1587205 A1 * | 10/2005 | ......... | F16H 25/2015 |
| EP | 1669171 A1 | 6/2006 | | |
| GB | 2459297 A | 10/2009 | | |
| JP | H04250988 A | 9/1992 | | |
| WO | WO-2009146737 A1 * | 12/2009 | ............. | F16H 25/20 |

OTHER PUBLICATIONS

Ackerman, E. "Figure Promises First General-Purpose Humanoid Robot," in IEEE Spectrum, Mar. 2, 2023, 11 pages: https://spectrum.ieee.org/figure-humanoid-robot#toggle-gdpr.

Bandara, D. S. V., et al. "Development of a multi-DoF transhumeral robotic arm prosthesis." Medical Engineering & Physics 48 (2017): 131-141.

Kumar, S., et al. "Kinematic analysis of a novel parallel 2sprr+ 1u ankle mechanism in humanoid robot." Advances in Robot Kinematics 2018 16. Springer International Publishing, 2019. https://www.researchgate.net/publication/325264356_Kinematic_Analysis_of_a_Novel_Parallel_2SPRR1U_Ankle_Mechanism_in_Humanoid_Robot.

Lohmeier, S., Design and realization of a humanoid robot for fast and autonomous bipedal locomotion. Diss. Technische Universität München, 2010, 214 pages: https://d-nb.info/1009450484/34.

Lohmeier, S., et al. "Humanoid robot LOLA-Research platform for high-speed walking." Motion and Vibration Control. Springer Netherlands, 2009, 10 pages: https://www.researchgate.net/figure/DoF-parallel-mechanism-in-the-ankle-joint-of-LOLA_fig2_226356986.

Paine, N., et al. "Actuator control for the NASA-JSC valkyrie humanoid robot: A decoupled dynamics approach for torque control of series elastic robots." Journal of field robotics 32.3 (2015): 378-396. https://sites.utexas.edu/hcrl/files/2016/01/jfr-valkyrie-actuator-control-final.pdf.

Pi Americas, "Hexapod 6-Axis Stages: High Performance 6-DOF Precision Positioning Systems & Motion Platforms," pi-usa.us, Accessed Feb. 13, 2025: https://www.pi-usa.us/en/products/6-axis-hexapods-parallel-positioners/?onl_goog_hexap&gclid=CjwKCAjwov6hBhBsEiwAvrvN6A5j_HE0q6P9e8IWgpSoCVMz_jhFkZcGBKOPvXnwvwAVaPWdwMilCBoCyb8QAvD_BwE.

Rogers, M. E. et al., "An Ankle-Foot Prosthesis for Rock Climbing Augmentation," in IEEE Transactions on Neural Systems and Rehabilitation Engineering, vol. 29, pp. 41-51, 2021, doi: 10.1109/TNSRE.2020.3033474.

Tesla, "Tesla AI Day 2022," streamed by Tesla Sep. 30, 2022, https://www.youtube.com/watch?v=ODSJsviD_SU.

International Search Report and Written Opinion of the International Searching Authority mailed Mar. 11, 2025 for International Application No. PCT/US2024/060032. 15 pages.

Sugahara, Y., et al. "Design of a battery-powered multi-purpose bipedal locomotor with parallel mechanism." IEEE/RSJ International Conference on Intelligent Robots and Systems. vol. 3. IEEE, 2002, pp. 2658-2663.

* cited by examiner

660

660

712
702
706
700
704
708
710

720

720

800

SCREW ACTUATOR

TECHNICAL FIELD

This disclosure relates generally to robotics, and more specifically to systems, methods and apparatuses for actuating components of robotic devices.

BACKGROUND

An example robot may have a plurality of members forming portions of the robot (e.g., the robot's legs and arms). The motion of these members may be controlled by actuators, such as electric actuators or hydraulic cylinders and motors. The design of these actuators can affect performance characteristics of the robot, such as how fast the robot can respond to commands and/or external disturbances. Design factors that affect performance of the robot may include a rotary inertia of the actuator, a gear ratio of a transmission coupled thereto, and other factors.

SUMMARY

Some desirable characteristics for robot actuators can include high torque per mass, low inertia, and low backlash. Actuators powered by electric motors typically require torque-increasing transmissions (e.g., gears or screws) between the electric motor and a connected robot joint to amplify motor torque. For robot joints with limited ranges of motion, screws (e.g., ball screws or planetary roller screws) can provide a compact, low inertia transmission, which can amplify the motor torque and/or position the mass of the actuator proximally within the robot limb, reducing limb inertia. Screw actuators can also be well-suited to "coupled" robot joints, in which multiple degrees of freedom can be controlled by actuators in parallel, rather than chained serially.

However, implementing screw transmissions in robots can impose several design challenges. First, torques exerted on the electric motor and/or the nut of the screw need to be reacted. In some cases, this can be accomplished using a sliding anti-rotation constraint between the screw and nut sides of the actuator, such as a keyed shaft or linear rail. However, such solutions typically add friction, complexity, and/or tight alignment tolerances between the screw and the linear guide. Second, to avoid unwanted side-loads from misalignment or structural deflection, screw actuators are typically connected to robot structures through spherical bearings. Spherical bearings wear through use and increase in backlash over time, which may degrade robot control. Third, side-loads and/or tilting between the screw and nut from misalignment or buckling can reduce life.

Some embodiments of the present invention address one or more of these design challenges. In one illustrative embodiment, a screw actuator is used to convert rotary motion from an electric motor into linear motion. The screw actuator is configured to be connected to a first robot structure by a first universal joint at a proximal end. The screw actuator is also configured to be connected to a second robot structure by a second universal joint at a distal end. The universal joints can support thrust loads produced by the actuator and/or can react the torque of the electric motor and/or the torque on the nut of the screw. The solution can be simple, light-weight, low-inertia, and low-backlash.

In some embodiments, universal joints with rolling-element bearings can help provide a low-friction, low-backlash interface between the actuator and one or more attached robot structures, which will not develop appreciable additional backlash over time through wear. Universal joints can also help eliminate sliding anti-rotation constraints. Universal joints can also help enable a higher range of motion for coupled joints than spherical bearings (e.g., in some embodiments, while spherical bearings typically tilt less than 25 degrees, universal joints can tilt at least 30, 35, 40 or 45 degrees).

In some embodiments, the rotor of the electric motor is coupled mechanically (e.g., directly or indirectly) to the shaft of the screw. In some embodiments, driving the screw rather than the nut minimizes the inertia of the screw actuator and/or reduces friction by minimizing the diameter of the bearings in the screw actuator. In some embodiments, a thrust bearing supports the axial load on the screw and/or constrains the rotation of the screw and/or rotor. In some embodiments, the thrust bearing is located near or adjacent to one of the universal joints (e.g., to minimize the length of the load path through the structure and/or isolate the electric motor from the load path). In some embodiments, a telescoping piston and/or cylinder (e.g., supported by one or more bushings) allow free translation and/or rotation along the stroke of the actuator. In some embodiments, such a configuration resists buckling and/or tilting between the screw and the nut when the actuator is in compression.

In one aspect, the invention features a screw actuator. The screw actuator includes a screw having a screw shaft and a screw nut. The screw shaft defines a first longitudinal axis along its length. The screw nut at least partially surrounds the screw shaft. The screw actuator includes a motor having a stator and a rotor. The rotor is mechanically coupled to the screw shaft. The stator at least partially surrounds the rotor. The screw actuator includes a first rigid member having a length dimension oriented along the first longitudinal axis. The screw actuator includes a second rigid member mechanically constrained relative to the first rigid member. The second rigid member is configured to move along a direction of the first longitudinal axis.

In some embodiments, the screw actuator has a force density of at least 10 kN/kg. In some embodiments, the screw actuator has an acceleration capability of at least 200 $m/s^2$. In some embodiments, the screw comprises a roller screw. In some embodiments, the roller screw comprises a planetary roller screw. In some embodiments, the screw comprises a ball screw. In some embodiments, the screw comprises a lead screw. In some embodiments, the motor comprises an electric motor. In some embodiments, the first rigid member comprises a cylinder. In some embodiments, the second rigid member comprises a piston.

In some embodiments, the rotor is formed of fiberglass. In some embodiments, the screw actuator includes a guide bushing in mechanical contact with an inner circumferential surface of the first rigid member and an outer circumferential surface of the second rigid member. In some embodiments, the screw nut is fixed with respect to the second rigid member. In some embodiments, the screw actuator includes a first universal joint disposed at a proximal end of the screw actuator. In some embodiments, the first universal joint comprises a first roller bearing. In some embodiments, the first universal joint is configured to tilt at least 30 degrees. In some embodiments, the first universal joint is configured to tilt at least 35, 40 or 45 degrees. In some embodiments, the screw actuator includes a first thrust bearing located adjacent to the first universal joint, the first thrust bearing configured to constrain rotation of at least one of the screw and the rotor.

In some embodiments, the screw actuator includes a second universal joint disposed at a distal end of the screw actuator. In some embodiments, the second universal joint comprises a second roller bearing. In some embodiments, the second universal joint is configured to tilt at least 30 degrees. In some embodiments, the second universal joint is configured to tilt at least 35, 40 or 45 degrees. In some embodiments, the first rigid member at least partially surrounds the second rigid member. In some embodiments, the second rigid member is configured to reciprocate telescopically with respect to the first rigid member. In some embodiments, the screw actuator includes a rotor encoder located adjacent to the motor. In some embodiments, the rotor encoder is arranged coaxially with the motor. In some embodiments, the screw actuator includes housing having a plurality of fins, the housing at least partially surrounding the motor. In some embodiments, the screw actuator is configured to actuate a joint having at least two degrees of freedom. In some embodiments, the rotor is mechanically coupled to the screw shaft via the screw nut. In some embodiments, the screw nut is arranged inside of the rotor. In some embodiments, the screw nut is arranged coaxially with the rotor. In some embodiments, the second rigid member is configured to freely spin around the first longitudinal axis.

In some embodiments, the invention includes a robot. The robot includes a first screw actuator (e.g., as shown and described herein) and a second screw actuator (e.g., as shown and described herein). The robot includes a first robot member mechanically coupled to (i) the first screw actuator at a first universal joint, and (ii) the second screw actuator at a second universal joint. The robot includes a second robot member mechanically coupled to (i) the first screw actuator at a third universal joint, and (ii) the second screw actuator at a fourth universal joint.

In some embodiments, the robot further includes a third screw actuator (e.g., as shown and described herein) and a fourth screw actuator (e.g., as shown and described herein). The robot includes a third robot member mechanically coupled to (i) the third screw actuator at a fifth universal joint, and (ii) the fourth screw actuator at a sixth universal joint, and a fourth robot member mechanically coupled to (i) the third screw actuator at a seventh universal joint, and (ii) the fourth screw actuator at an eighth universal joint. In some embodiments, the first screw actuator and the second screw actuator form a portion of a back assembly for the robot and the third screw actuator and the fourth screw actuator form a portion of an ankle assembly for the robot.

In another aspect, the invention features an ankle assembly for a robot. The ankle assembly includes a foot member. The ankle assembly includes a lower leg member coupled to the foot member at a first universal joint and a second universal joint. The ankle assembly includes a first screw actuator (e.g., as shown and described herein) in the lower leg member. The first screw actuator is coupled to the first universal joint. The ankle assembly includes a second screw actuator (e.g., as shown and described herein) in the lower leg member. The second screw actuator is coupled to the second universal joint. In some embodiments, an axis of the first screw actuator is canted with respect to an axis of the second screw actuator.

In another aspect, the invention features a back assembly for a robot. The back assembly includes a lower back member. The back assembly includes an upper back member coupled to the lower back member at a first universal joint and a second universal joint. The back assembly includes a first screw actuator (e.g., as shown and described herein) in the lower back member. The first screw actuator is coupled to the first universal joint. The back assembly includes a second screw actuator (e.g., as shown and described herein) in the upper back member. The second screw actuator is coupled to the second universal joint. In some embodiments, the back assembly provides a mechanical advantage of at least 50:1.

In another aspect, the invention features a method of manufacturing a screw actuator. The method includes affixing a magnet ring to a rotor hub. The method includes affixing a nut of a screw to a piston. The method includes pressing the rotor hub onto a shaft of the screw to form a first assembly. The method includes affixing a stator in a motor housing. The method includes installing a cylinder in the motor housing to form a second assembly. The method includes fitting the first assembly into the second assembly along a linear axis. The piston guides alignment of the first assembly to the second assembly to form a composite assembly. The method includes installing a proximal universal joint at a proximal end of the composite assembly. The method includes installing a distal universal joint at a distal end of the composite assembly.

In some embodiments, the method includes aligning one or more bearings to the shaft of the screw. In some embodiments, the method includes affixing a circuit board stack to the first assembly. In some embodiments, the method includes affixing a thrust bearing to the first assembly. In some embodiments, at least one of the proximal universal joint or the distal universal joint is manufactured by (i) manufacturing a universal joint component having a first section, a second section, and one or more bridges connecting the first section to the second section; and (ii) removing the bridges to leave the first section mechanically constrained within the second section.

In another aspect, the invention features a screw actuator. The screw actuator includes a screw having a shaft and a nut. The shaft defines a first linear axis along its length. The screw actuator includes a motor having a stator and a rotor. The rotor is mechanically coupled to the shaft and configured to drive the shaft. The screw actuator includes a cylinder coupled to the stator. The cylinder has a length dimension oriented along the first linear axis. The screw actuator includes a piston at least partially surrounding the cylinder and mechanically constrained relative to the cylinder. The piston is configured to move along a direction of the first linear axis. The screw actuator includes a first universal joint at a proximal end of the screw actuator. The screw actuator includes a second universal joint at a distal end of the screw actuator. The screw actuator includes a thrust bearing located adjacent to one of the first universal joint or the second universal joint. The thrust bearing is configured to support an axial load on the screw and/or constrain rotation of the screw.

In another aspect, the invention features a screw actuator. The screw actuator includes a screw having a screw shaft and a screw nut. The screw shaft defines a first longitudinal axis along its length, and the screw nut at least partially surrounds the screw shaft. The screw actuator includes a first rigid member having a length dimension oriented along the first longitudinal axis, and a second rigid member mechanically constrained relative to the first rigid member, the second rigid member configured to move along a direction of the first longitudinal axis. The screw actuator further includes a first universal joint disposed at a proximal end of the screw actuator, and a second universal joint disposed at a distal end of the screw actuator.

In some embodiments, the screw actuator has a force density of at least 10 kN/kg. In some embodiments, the screw actuator has an acceleration capability of at least 200 m/s². In some embodiments, the screw comprises a roller screw. In some embodiments, the roller screw comprises a planetary roller screw. In some embodiments, the screw comprises a ball screw. In some embodiments, the screw comprises a lead screw. In some embodiments, the motor comprises an electric motor. In some embodiments, the first rigid member comprises a cylinder. In some embodiments, the second rigid member comprises a piston.

In some embodiments, the rotor is formed of fiberglass. In some embodiments, the screw actuator includes a guide bushing in mechanical contact with an inner circumferential surface of the first rigid member and an outer circumferential surface of the second rigid member. In some embodiments, the screw nut is fixed with respect to the second rigid member. In some embodiments, the first universal joint comprises a first roller bearing. In some embodiments, the first universal joint is configured to tilt at least 30 degrees. In some embodiments, the first universal joint is configured to tilt at least 35, 40 or 45 degrees. In some embodiments, the screw actuator includes a first thrust bearing located adjacent to the first universal joint, the first thrust bearing configured to constrain rotation of at least one of the screw and the rotor.

In some embodiments, the second universal joint comprises a second roller bearing. In some embodiments, the second universal joint is configured to tilt at least 30 degrees. In some embodiments, the second universal joint is configured to tilt at least 35, 40 or 45 degrees. In some embodiments, the first rigid member at least partially surrounds the second rigid member. In some embodiments, the second rigid member is configured to reciprocate telescopically with respect to the first rigid member. In some embodiments, the screw actuator includes a rotor encoder located adjacent to the motor. In some embodiments, the rotor encoder is arranged coaxially with the motor. In some embodiments, the screw actuator includes housing having a plurality of fins, the housing at least partially surrounding the motor. In some embodiments, the screw actuator is configured to actuate a joint having at least two degrees of freedom. In some embodiments, the rotor is mechanically coupled to the screw shaft via the screw nut. In some embodiments, the screw nut is arranged inside of the rotor. In some embodiments, the screw nut is arranged coaxially with the rotor. In some embodiments, the second rigid member is configured to freely spin around the first longitudinal axis.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

Like reference symbols in the various drawings indicate like elements.

DETAILED DESCRIPTION

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

I. Example Robotic Systems

Figure 1:
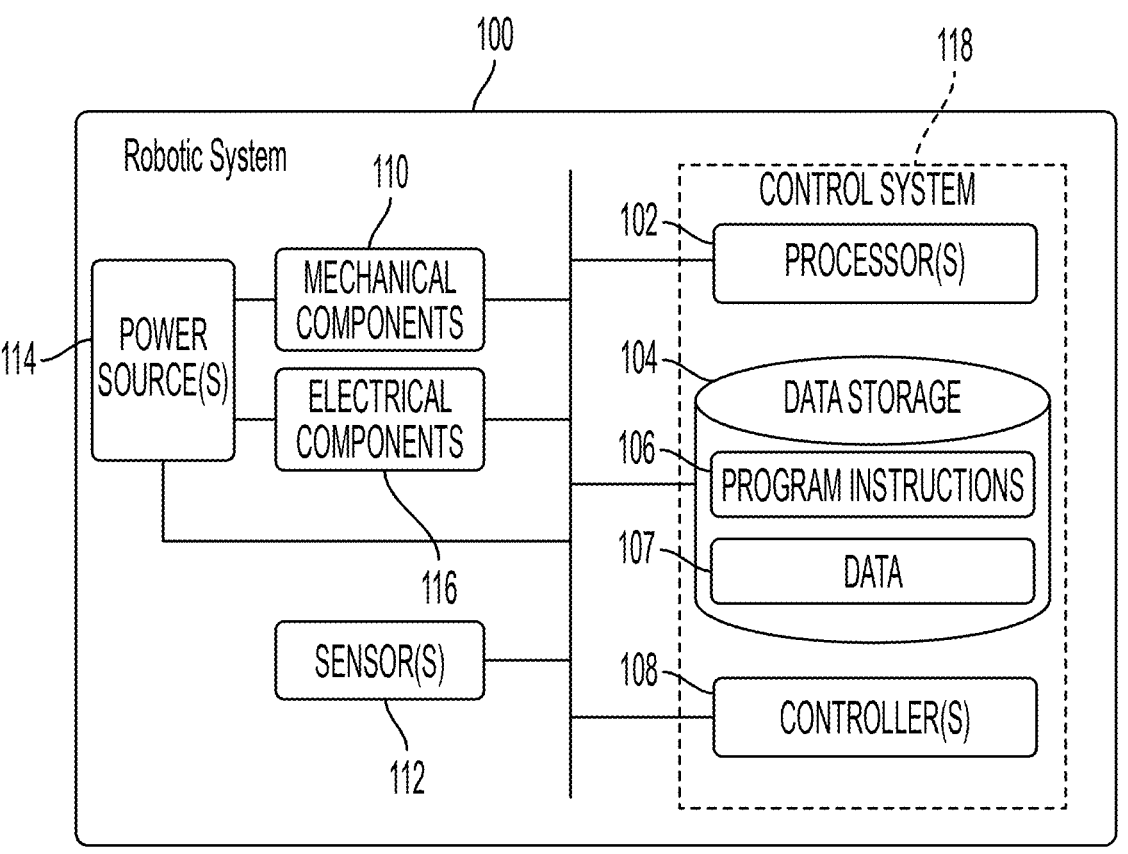
FIG. 1 illustrates a configuration of a robotic system, in accordance with an example implementation.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations, and could be part of an exoskeleton or human assisting device.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device.

Further, the control system 118 may serve as an interface between the robotic system 100 and a user. For instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic system 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic system 100, such as on the body and/or on one or more of the appendages, among other examples. On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
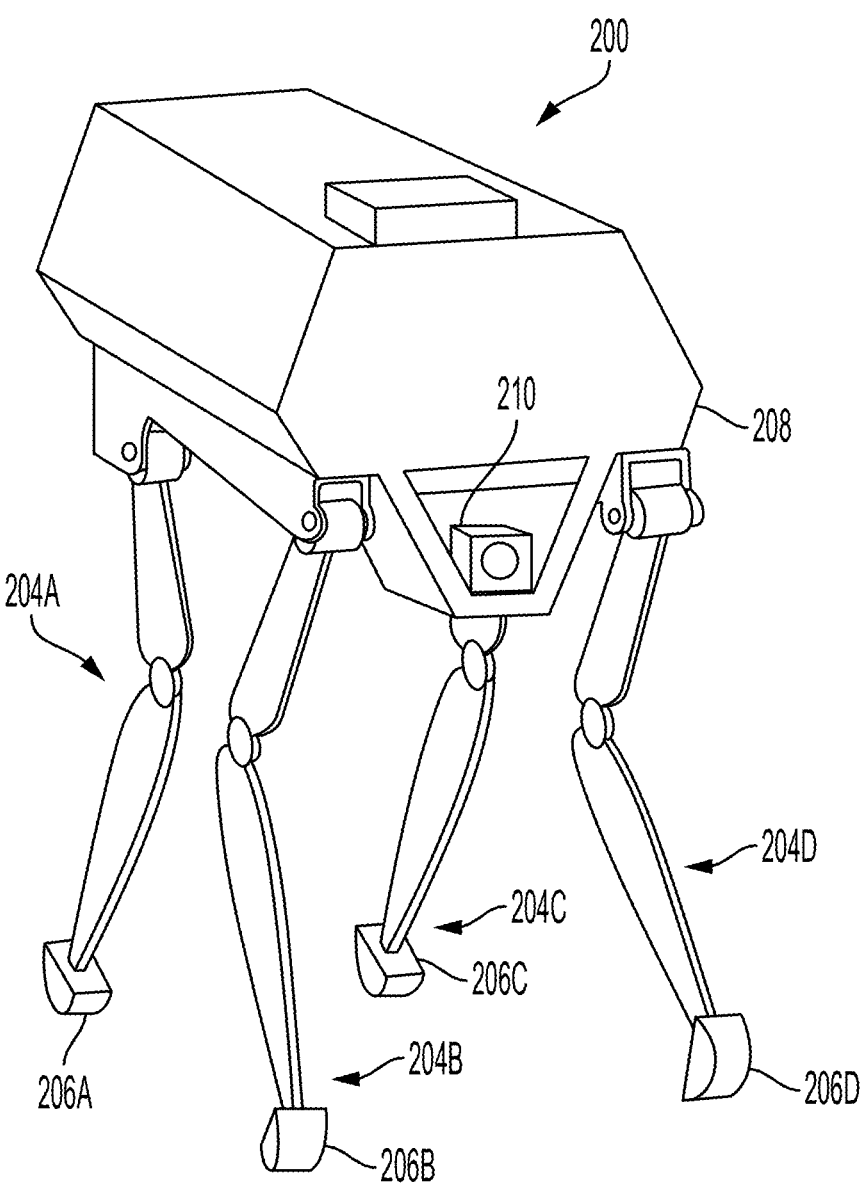
FIG. 2 illustrates a quadruped robot, in accordance with an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems. The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
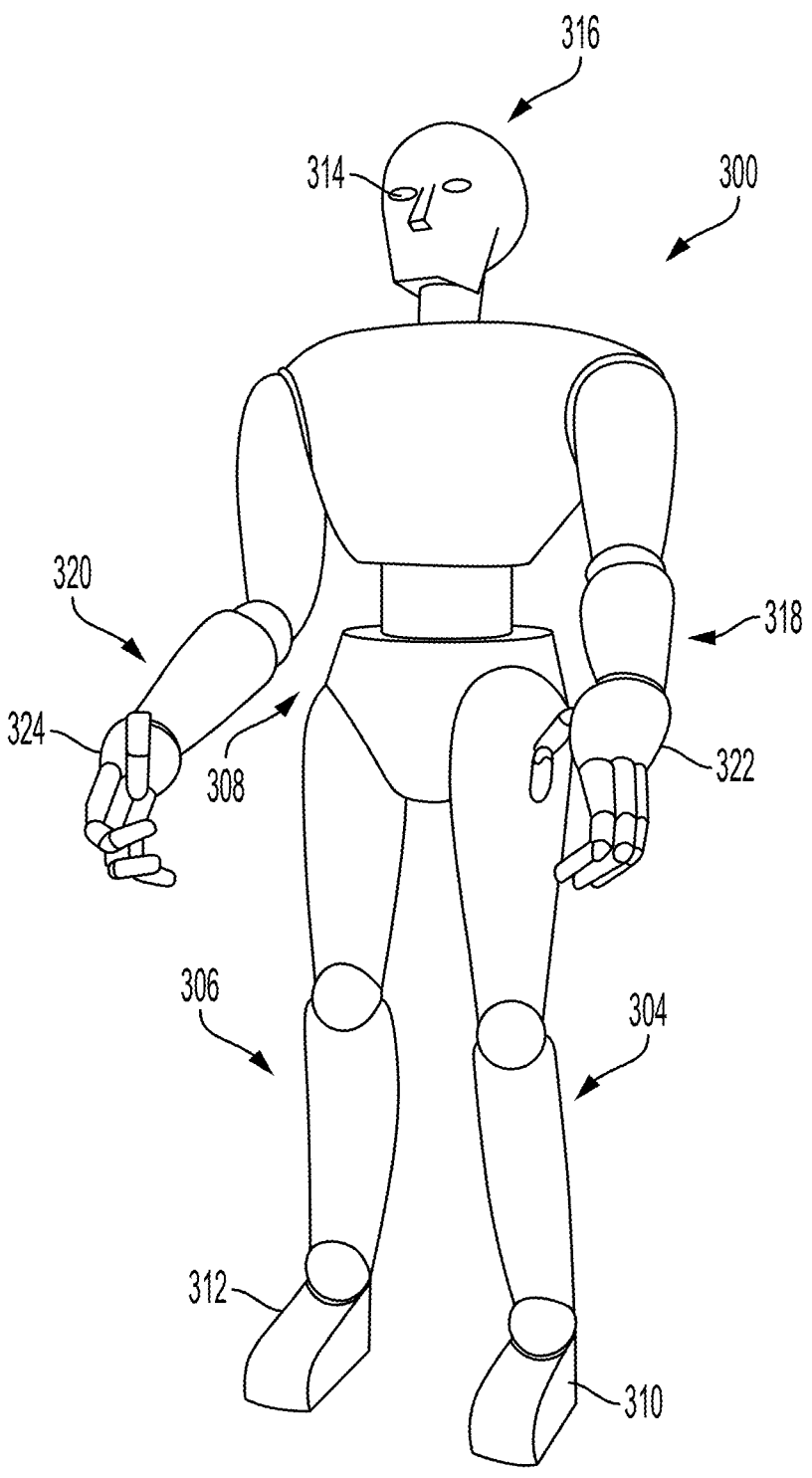
FIG. 3 illustrates a biped robot, in accordance with another example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 (or end-effectors) for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

II. Example Electromechanical Actuators and Robots Utilizing Them

In examples, hydraulic actuators could be used to actuate members of a robot. A hydraulic system may include a pump and accumulator at a central location on the robot and be configured to provide pressurized hydraulic fluid through pipes and/or hoses to hydraulic actuators coupled to the members of the robot. In this configuration, the actuation inertia of the pump and accumulator is decoupled from inertia provided to the ground surface as the robot moves. Due to the decoupling of inertias, hydraulic robotic systems are characterized by high bandwidth for position and force control responsiveness. However, hydraulic systems have disadvantages such as potential hydraulic fluid leaks, complexity of plumbing, and unsuitability of existing hydraulic power units to smaller robots.

Electromechanical actuators alleviate at least some disadvantages of hydraulic actuators because there are no leaks or complex plumbing involved with operating electromechanical actuators. Further, electromechanical systems may be more efficient than hydraulic systems. However, electromechanical actuators may have disadvantages compared to hydraulic systems. For instance, while the rotating inertia of a robot member driven by a hydraulic actuator might have a linear relationship with a diameter of the actuator for a given strength, the rotating inertia of a robot member driven by an electromechanical actuator may be proportional to the square of the diameter of the actuator's rotating assembly and is influenced by the gear ratio of the transmission for the given strength. Further, reflected inertia of a hydraulic actuator might be negligible compared to the inertia of a member (e.g., leg) of a robot, whereas reflected inertia of an electromechanical actuator may depend on inertias of the motor and the transmission multiplied by the square of the gear ratio of the transmission. Thus, for large robots, electromechanical actuators may have a high inertia that limits responsiveness and performance characteristics of the robot.

For robots smaller in size, electromechanical actuators could be designed, as described in this disclosure, to achieve high performance characteristics compared to corresponding hydraulic actuators. Disclosed herein are systems, actuators, configurations, and apparatuses that reduce rotating inertia of robot members to allow for achieving high peak torques capable of providing sufficiently high accelerations suitable for high performance robots.

Figure 4:
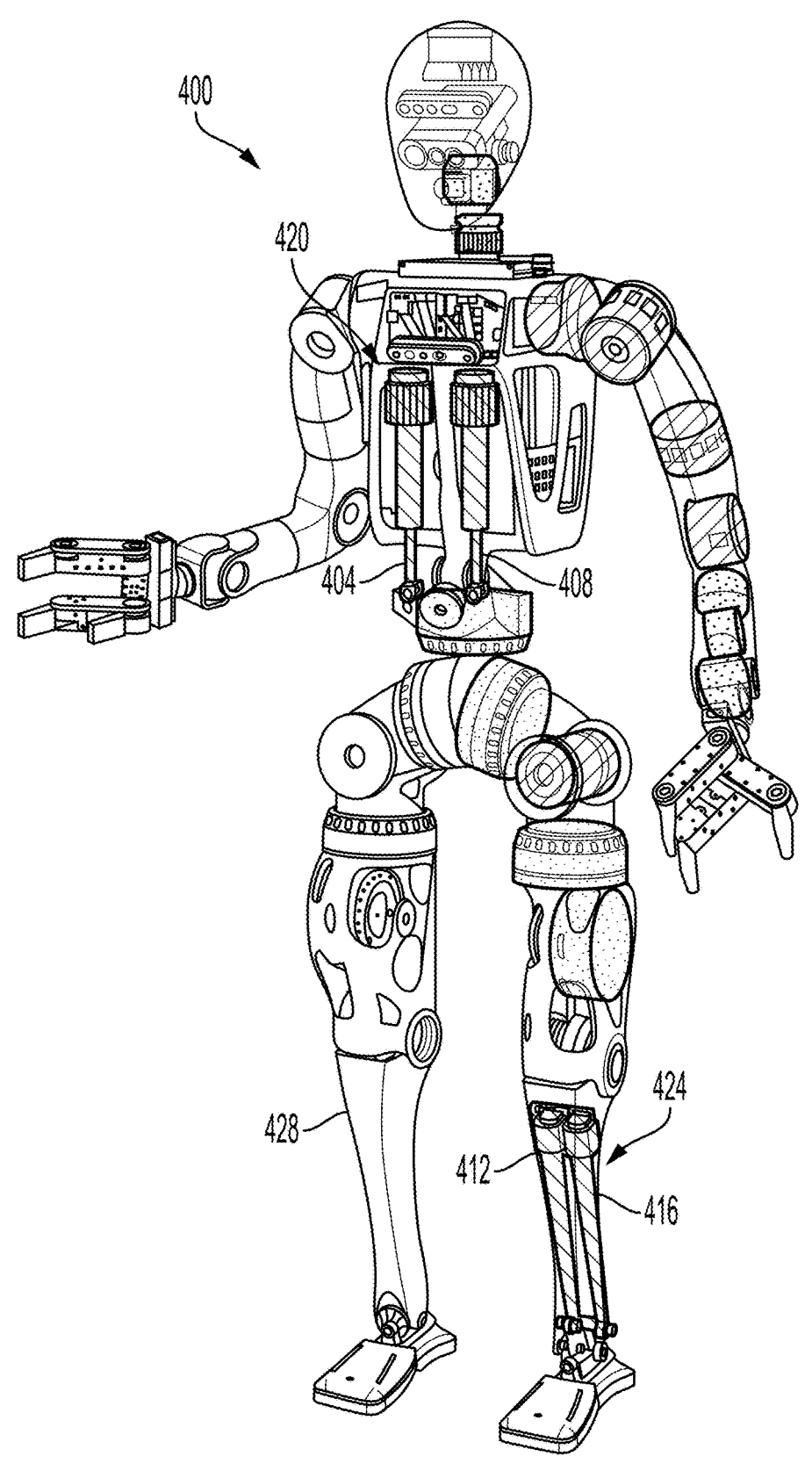
FIG. 4 illustrates a biped robot having multiple screw actuators depicted, in accordance with another example implementation.

FIG. 4 illustrates a biped robot 400 having multiple screw actuators 404, 408, 412, 416 depicted, in accordance with another example implementation. In this example, two screw actuators 404, 408 are fixed parallel (or substantially parallel) within a torso of the biped robot 400 and comprise a back mechanism 420 of the biped robot 400. Also in this example, two screw actuators 412, 416 are fixed parallel (or substantially parallel) within a lower leg of the biped robot 400 and comprise an ankle mechanism 424 of the biped robot 400. Further details of the back mechanism 420 are shown and described below in connection with FIGS. 7A-7E, and further details of the ankle mechanism 424 are shown and described below in connection with FIGS. 8A-8F. In this example, two additional screw actuators are included in the other lower leg as well, but are not visible as they are arranged behind an exterior covering 428 of the other lower leg. Other implementations are also possible in which more or fewer screw actuators are used.

During operation, the back mechanism 420 and/or ankle mechanism 424 may experience high accelerations that result, for example, from controlling the robot 400 to move fast (e.g., to run or jog). High accelerations could also occur when the robot 400 is subjected to a disturbance (e.g., at its leg), and the robot 400 responds by moving the leg (e.g., via the ankle joint) at a high acceleration to maintain balance. In some embodiments, the back mechanism 420 and/or ankle mechanism 424 include one or more electric motors that are coupled to the ankle and/or back joints, respectively, of the robot 400, such that rotational motion of the motor causes an attached member (e.g., a foot member, in the case of the ankle) of the robot 400 to rotate relative to an adjacent member (e.g., a lower leg member, in the case of the ankle) that is coupled to the foot member at the ankle joint. In some embodiments, the rotational inertia of the motor may limit the responsiveness of the robot 400, and may thus reduce effectiveness of force control strategies of the lower leg member and/or foot member. Reducing the rotational inertia of the motor (e.g., by using one or more screw actuators as shown and described herein) can improve force control strategies used by the biped robot 400.

Figure 5A:
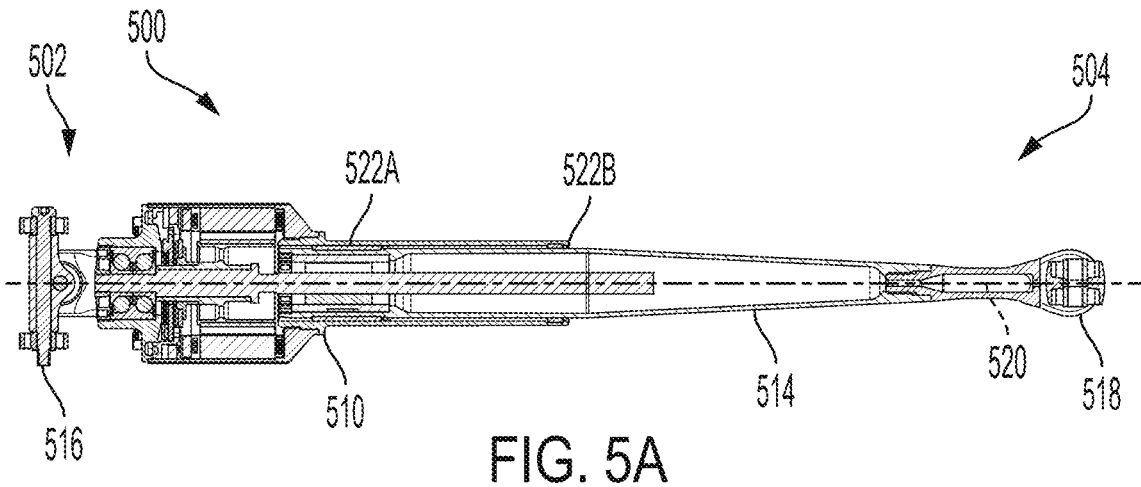
FIG. 5A illustrates a half-sectional schematic view of a screw actuator, in accordance with another example implementation.
Figure 5B:
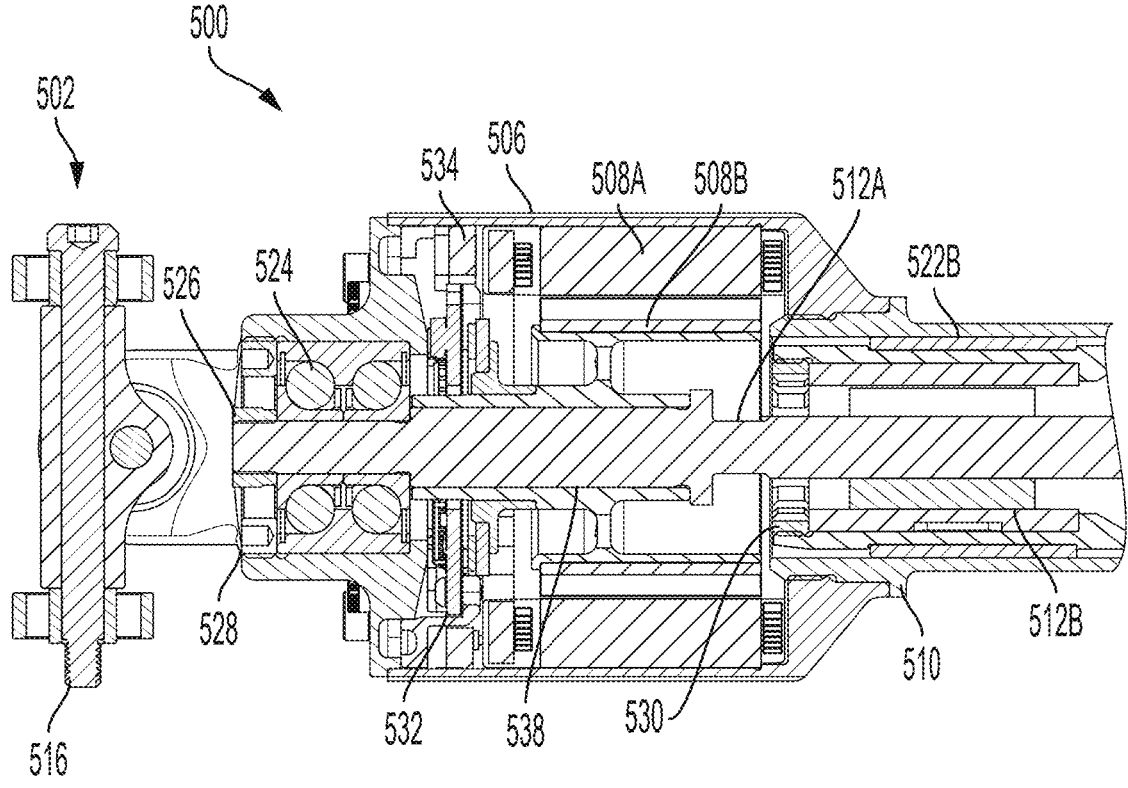
FIG. 5B illustrates a zoomed-in view of the half-sectional schematic view of FIG. 5A, in accordance with another example implementation.

FIG. 5A illustrates a half-sectional schematic view of a screw actuator 500 and FIG. 5B illustrates a zoomed-in view of the half-sectional schematic view of FIG. 5A, in accordance with another example implementation. The screw actuator 500 is a mechanical linear actuator that translates rotational motion (e.g., of an electric motor) into linear motion (e.g., of a piston relative to a cylinder). The screw actuator 500 includes a proximal portion 502 and a distal portion 504. The proximal portion 502 includes multiple components that are rigidly coupled to each other, including a motor housing 506, a stator 508A, and a first rigid member 510 (e.g., a cylinder). A rotor 508B is positioned within the stator 508A and is mechanically coupled (e.g., directly mounted and/or attached to) a screw shaft 512A at an interface 538. The screw shaft 512A is mounted coaxially with the rotor 508B. The distal portion 504 also includes multiple components that are rigidly coupled to each other, including a second rigid member 514 (e.g., a piston) and a screw nut 512B, which is threaded onto the screw shaft 512A. Together the stator 508A and the rotor 508B comprise the motor 508 (e.g., as shown below in FIG. 6I). Together the screw shaft 512A and the screw nut 512B comprise the screw 512 (e.g., as shown below in perspective view in FIG. 6J and in half sectional view in FIG. 6K). In some embodiments, a first universal joint 516 is rigidly coupled to the first rigid member 510. In some embodiments, a second universal joint 518 is rigidly coupled to the second rigid member 514. In some embodiments, the first rigid member 510 at least partially surrounds the second rigid member 514.

During operation, the rotor 508B rotates and causes the coupled screw shaft 512A to rotate in tandem, which in turn causes the screw nut 512B to travel along a linear axis 520 of the screw actuator 500. Because the screw nut 512B is fixed to the second rigid member 514, the second rigid member 514 travels longitudinally along the linear axis 520 of the screw actuator 500 and moves (e.g., extends, contracts, and/or reciprocates) with respect to the first rigid member 510. The first rigid member 510 and the second rigid member 514 can be maintained relative to each other radially as they slide past each other axially using one or more bearings 522 (e.g., the axially longer bearing 522A and/or the axially shorter bearing 522B). In some embodiments, the one or more bearings 522 are guide bushings (e.g., as shown below in FIG. 6D). In some embodiments, the one or more bearings 522 are in mechanical contact (e.g., direct or indirect rigid contact) with an inner circumferential surface of the first rigid member 510 and/or an outer circumferential surface of the second rigid member 514.

During operation, when the screw nut 512B slides relative to the screw shaft 512A, a force is produced between the screw shaft 512A and the screw nut 512B. In the proximal portion 502, this force is reacted by a thrust bearing 524. In some embodiments, the thrust bearing 524 includes an inner locking member 526 (e.g., a race lock nut or lock ring) and/or an outer locking member 528 (e.g., another race lock nut or lock ring), one or both of which can experience and/or react the screw thrust during operation. In the distal portion 504, an equal and opposite force is reacted, which takes the form of a reaction torque experienced by the screw nut 512B in response to the thrust provided to the screw nut 512B. In some embodiments, a lock nut 530 axially clamps the screw nut 512B and/or experiences a portion of the thrust of the screw 512 and/or the torque of the motor 508.

In some embodiments, one or both of the universal joints 516, 518 include two rotational degrees of freedom. In some embodiments, the screw actuator 500 includes one additional rotational degree of freedom and/or one additional linear degree of freedom between the first rigid member 510 and the second rigid member 514. In some embodiments, the first universal joint 516 and/or the second universal joint 518 react torques exerted on the motor 508 and/or on the screw nut 512B. In some conventional configurations, such reactions may be accomplished by one or more sliding anti-rotation constraints (e.g., as a keyed shaft or linear rail) between the screw shaft and screw nut sides of the screw actuator 500. In some embodiments, using a first universal joint 516 and/or a second universal joint 518 to accomplish this function can lower friction and/or complexity of the screw actuator 500 relative to such conventional configurations. In some embodiments, using one or more universal joints can remove the need to achieve tight alignment tolerances between the screw and the linear guide (e.g., a pair of bushings that constrains the output of screw actuator 500 to move in a straight line) by ensuring there are no (or small) off-axis bending moments on the screw 512, which may jam the screw nut 512B on the screw 512. In some embodiments, using one or more universal joints can enable higher ranges of motion for coupled joints (e.g., enabling tilt of at least 30 degrees or at least 45 degrees), particularly as compared with spherical bearings (which can typically tilt less than 25 degrees).

During operation, the screw shaft 512A is also subjected to compressive and/or tensile forces. For instance, if the screw shaft 512A is rotating in a direction (e.g., counter-clockwise) that causes the screw nut 512B to retract, thus pulling the second rigid member 514 inward, the screw shaft 512A may be under tension. On the other hand, if the screw shaft 512A is rotating in an opposite direction (e.g., clockwise) that causes the screw nut 512B to extend, thus pushing the second rigid member 514 outward, the screw shaft 512A may be under compression. In some instances, screw actuators supporting movement of a lower leg, ankle and/or foot of a robot, which may be in contact with a ground surface, may experience a compressive force even when the robot is standing in place (e.g., to maintain balance). In some instances, screw actuators may be subjected to environmental conditions that result in forces in the screw shaft sufficiently high to cause buckling therein. In some embodiments, the present invention resists such buckling by reacting a tilting between the first rigid member 510 and the second rigid member 514 (e.g., via the two guide bushings 522A, 522B, which reduce tilting of the screw nut 512B relative to the screw shaft 512A).

In some embodiments, the motor 508 is an electric motor. In some embodiments, the screw 512 is a roller screw (e.g., a planetary roller screw), but other embodiments are also possible (e.g., a ball screw, lead screw, or another similar type of screw). In some embodiments, the screw shaft 512A includes a multi-start V-shaped thread on a periphery thereof. The V-shaped thread provides a helical raceway for multiple rollers radially arrayed around the screw shaft 512A and encapsulated by the screw nut 512B. The rollers are not shown in FIG. 5A to reduce visual clutter in the drawings. The screw nut 512B can be threaded on an interior peripheral surface to interface with the V-shaped thread of the screw shaft 512A. The rollers can spin in contact with, and/or serve as low-friction transmission elements between, the screw shaft 512A and the screw nut 512B. The rollers may have a single-start thread with convex flanks that limit friction at the contacts of the rollers with the screw shaft

512A and/or the screw nut 512B. The rollers (e.g., planetary or satellite rollers) may orbit the screw shaft 512A as they spin (e.g., like planet gears to a sun gear).

Figure 6A:
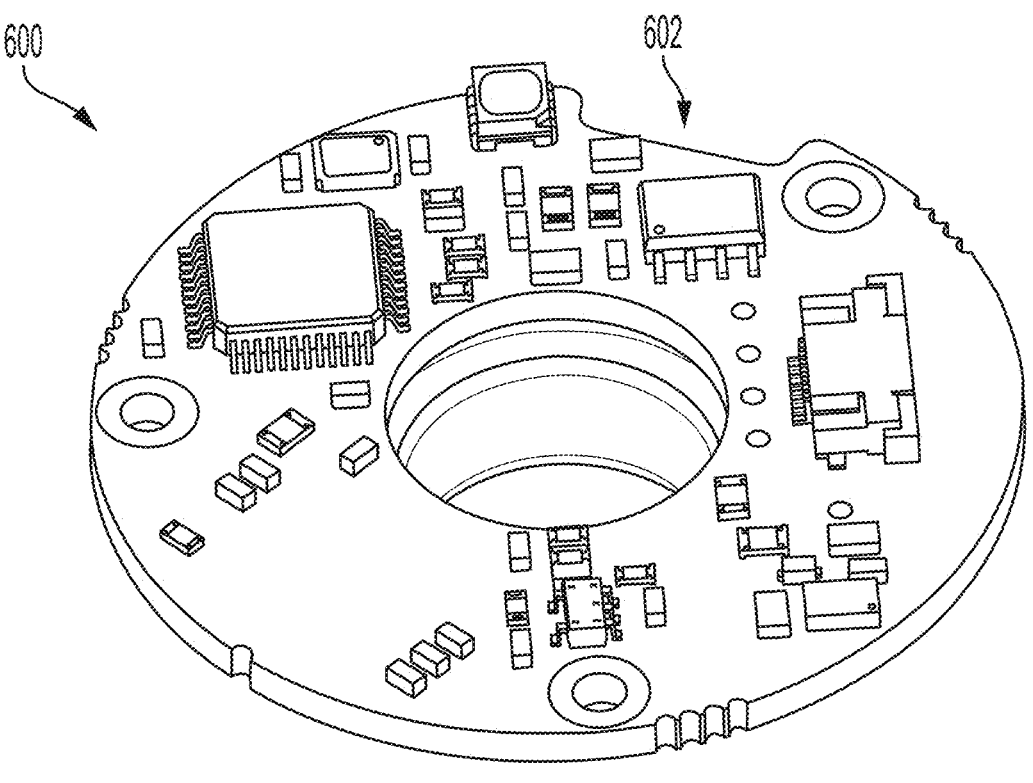
FIG. 6A illustrates a schematic view of a rotor encoder for a screw actuator, in accordance with another example implementation.
Figure 6B:
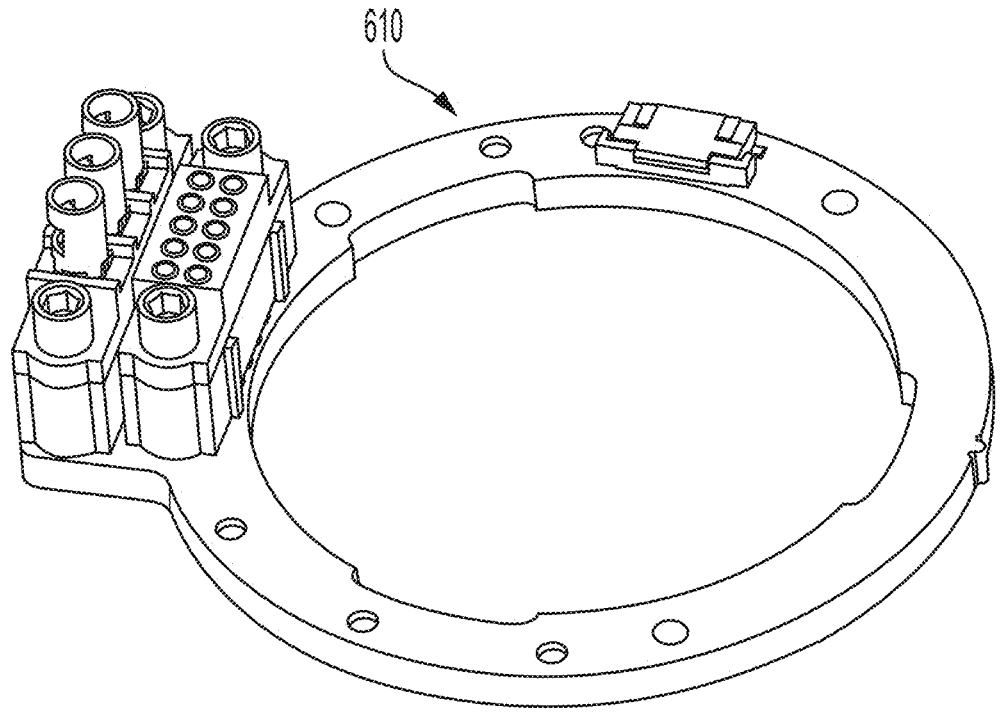
FIG. 6B illustrates a schematic view of an interface printed circuit board (PCB) for a screw actuator, in accordance with another example implementation.

In some embodiments, the screw actuator 500 includes an encoder 532 (e.g., the encoder 600 shown in FIG. 6A). The encoder 532 can be configured to generate a signal indicative of a rotary position of the rotor 508B. In some embodiments, the encoder 532 provides information indicative of the rotary position of the rotor 508B to a controller. The controller may implement closed-loop feedback control on the rotary position of the rotor 508B so as to accurately position the screw nut 512B within the first rigid member 510. In some embodiments, the screw actuator 500 also includes an interface printed circuit boards (PCB) 534 (e.g., the interface PCB 610 shown in FIG. 6B). In some embodiments, the interface PCB 534 provides a means to electrically connect circuit components to the motor 508 and/or the rotor encoder 532. In some embodiments, the interface PCB 534 includes a clocking tab (e.g., the clocking tab 602 shown in FIG. 6A) for aligning the interface PCB 534 to the motor housing 506.

Figure 6C:
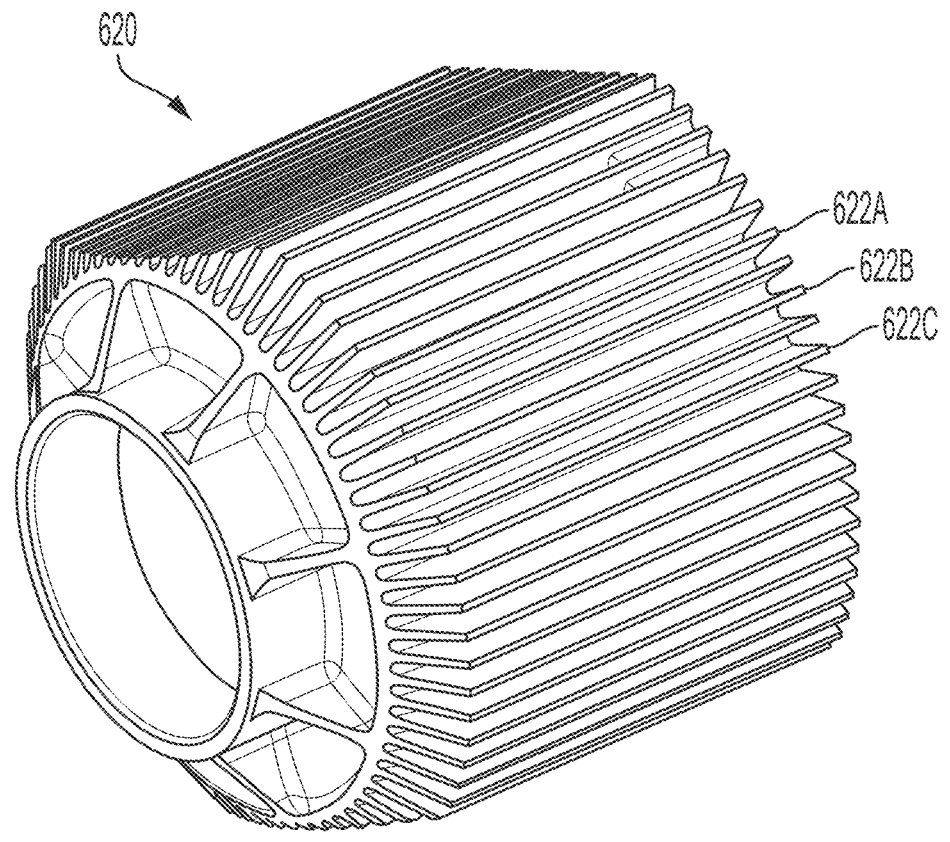
FIG. 6C illustrates a schematic view of a motor housing for a screw actuator, in accordance with another example implementation.
Figure 6D:
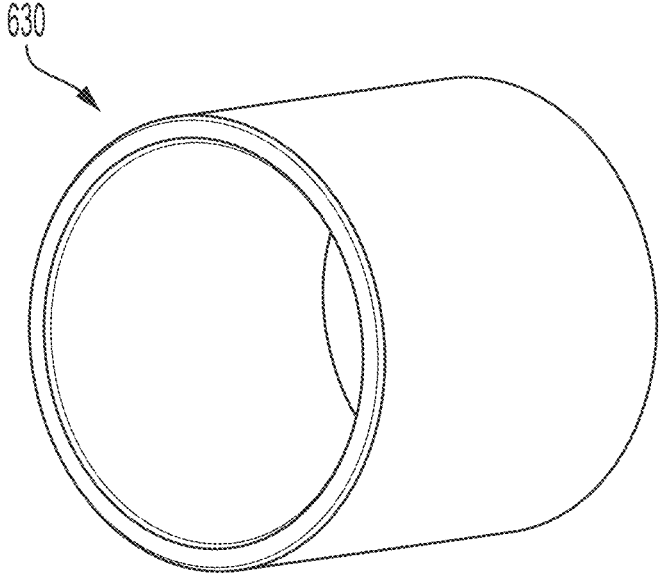
FIG. 6D illustrates a schematic view of a bearing for a screw actuator, in accordance with another example implementation.
Figure 6E:
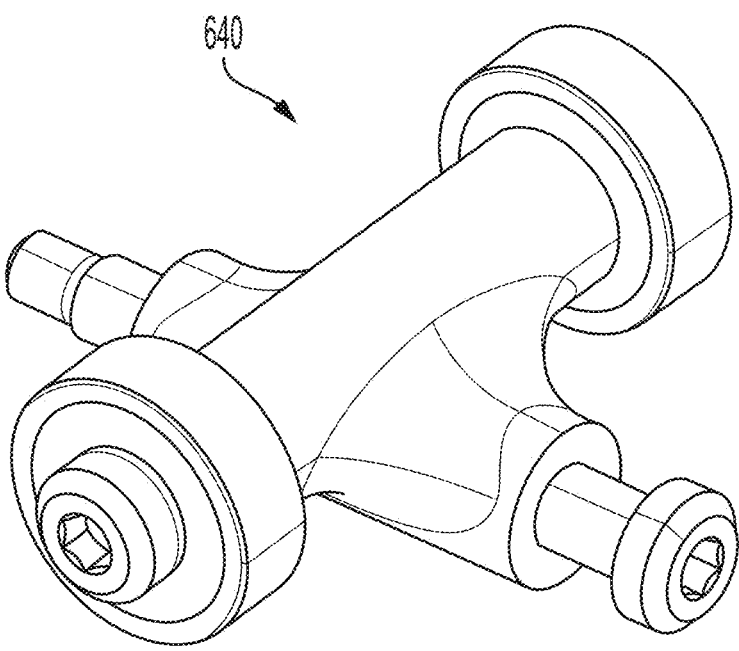
FIG. 6E illustrates a schematic view of a proximal universal joint for a screw actuator, in accordance with another example implementation.
Figure 6F:
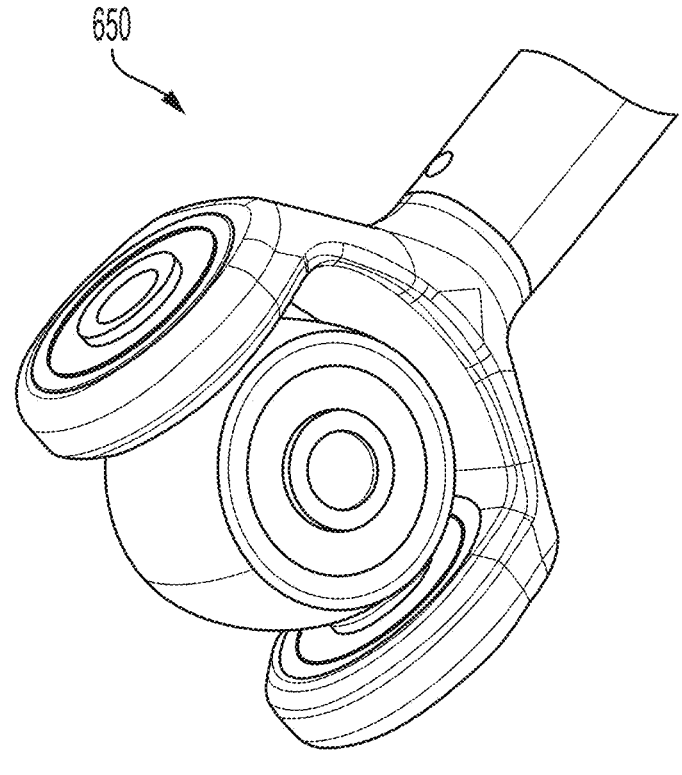
FIG. 6F illustrates a schematic view of a distal universal joint for a screw actuator, in accordance with another example implementation.

In some embodiments, the motor housing 506 (e.g., the motor housing 620 shown and described below in FIG. 6C) has one or more "fins" (e.g., the fins 622A-C shown in FIG. 6C) which provide additional surface area for exchanging heat with external air and thereby cooling the motor 508. In some embodiments, the first rigid member 510 can be press fit into the motor housing 506, in which case the motor housing 506 may experience a torque due to the rotation of the motor 508. In some embodiments, the bearing(s) 522A and/or 522B (e.g., the bearing 630 shown in FIG. 6D, which can be a guide bushing) are each substantially cylindrical bearings with a high wear resistance, low coefficient of friction, and/or vibration damping capabilities. In some embodiments, the first (e.g., proximal) universal joint 516 (e.g., the proximal universal joint 640 shown in FIG. 6E) tilts less than 10 degrees in each direction. In some embodiments, the second (e.g., distal universal) joint 518 (e.g., the distal universal joint 650 shown in FIG. 6F) tilts in excess of 40 degrees in each direction. In some embodiments (e.g., as shown and described below in FIGS. 8-9), different packaging constraints and/or range-of-motion requirements for the proximal and distal universal joints may result in different design details (e.g., amount of tilt).

Figure 6G:
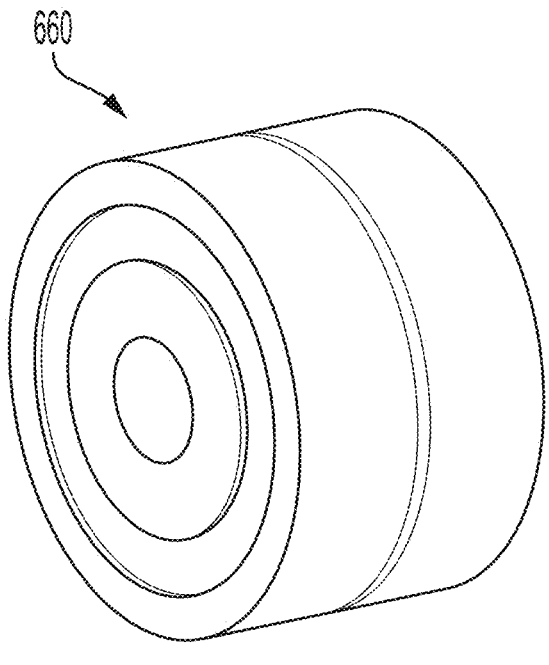
FIG. 6G illustrates a schematic perspective view of a thrust bearing for a screw actuator, in accordance with another example implementation.
Figure 6H:
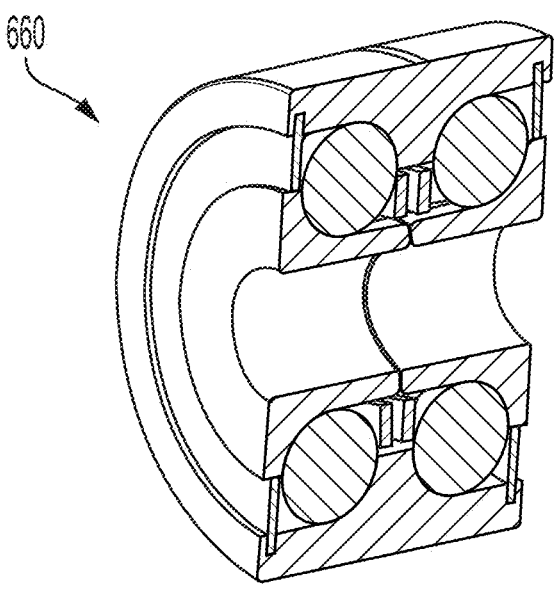
FIG. 6H illustrates a schematic half sectional view of a thrust bearing for a screw actuator, in accordance with another example implementation.
Figure 6I:
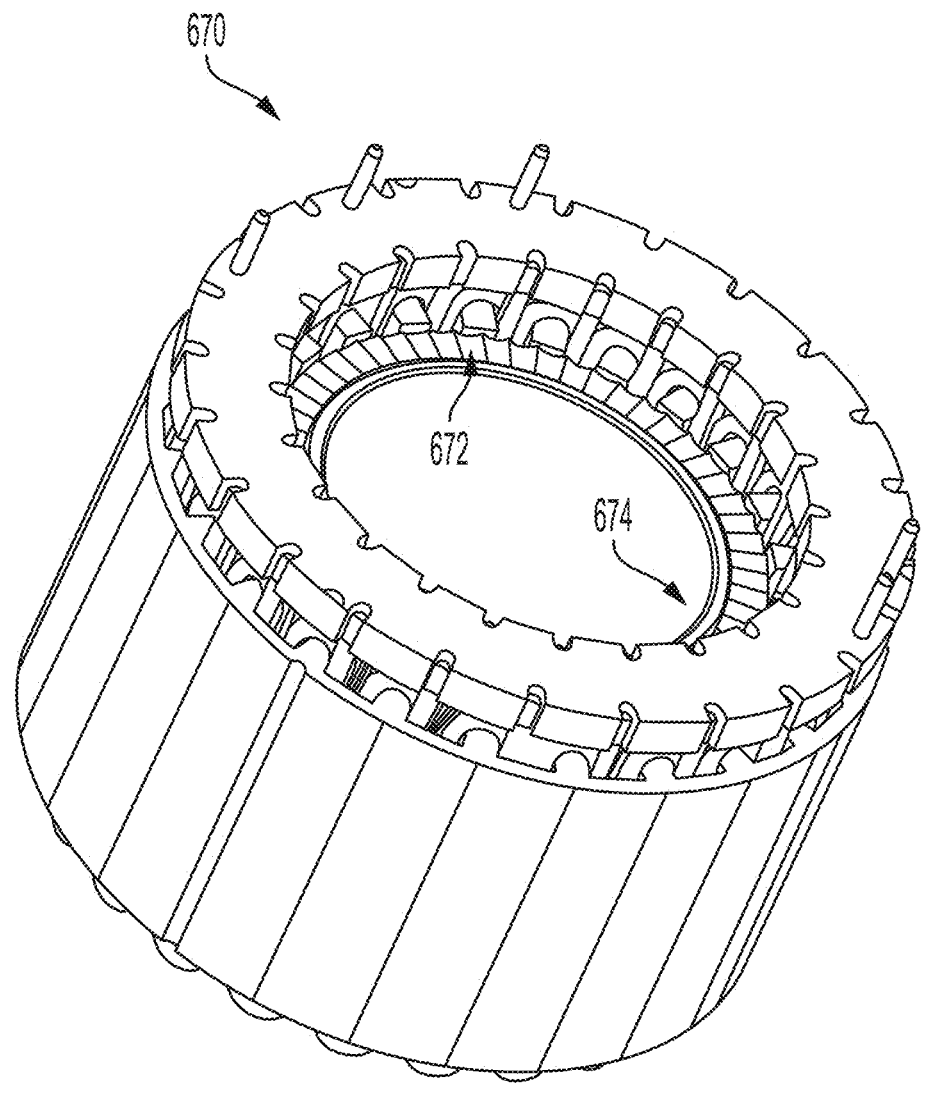
FIG. 6I illustrates a schematic view of an electric motor for a screw actuator, in accordance with another example implementation.
Figure 6J:
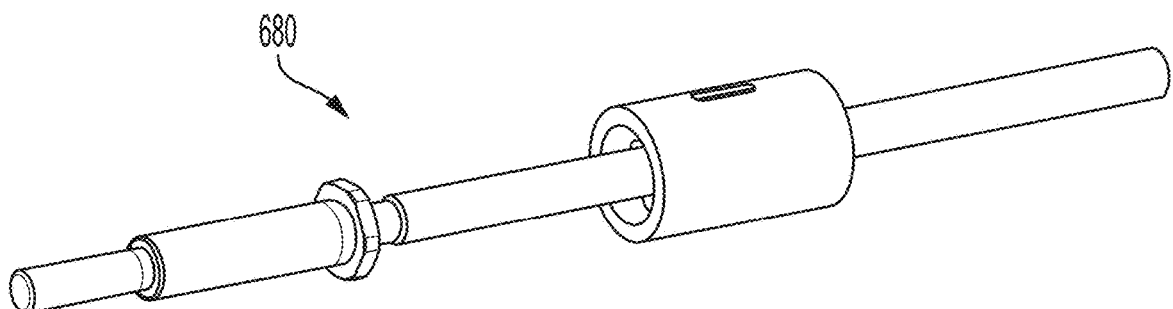
FIG. 6J illustrates a schematic perspective view of a planetary roller screw for a screw actuator, in accordance with another example implementation.
Figure 6K:
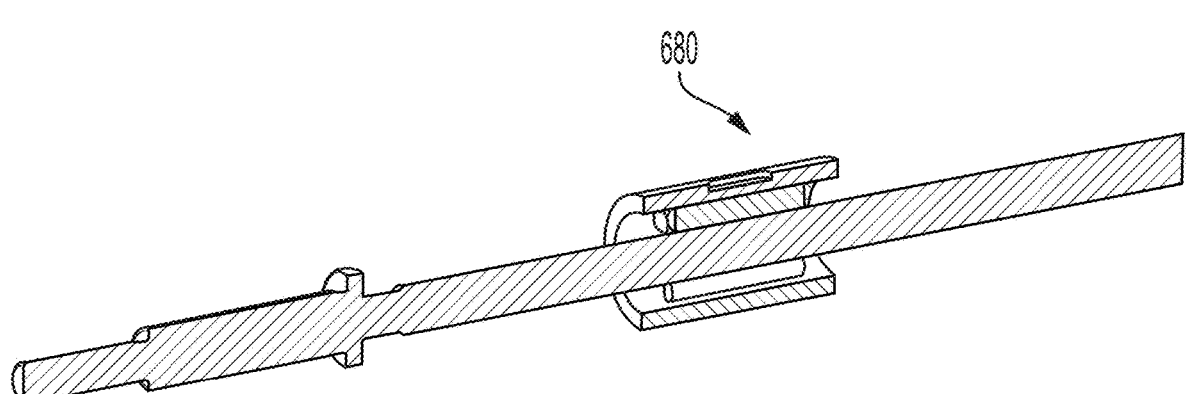
FIG. 6K illustrates a schematic half sectional view of a planetary roller screw for a screw actuator, in accordance with another example implementation.

In some embodiments, the thrust bearing 524 (e.g., the thrust bearing 660 shown in perspective view in FIG. 6G and half sectional view in FIG. 6H) is an axial angular contact ball bearing. In some embodiments, the motor 508 (e.g., the motor 670 shown in FIG. 6I) includes a stator 508A and a rotor 508B. In some embodiments, the rotor 508B includes a rotor hub (e.g., the rotor hub 672 shown in FIG. 6I) and a magnet ring (e.g., the magnet ring 674 shown in FIG. 6I). In FIG. 5A, the motor 508 is shown in line with the screw shaft 512A, but in some embodiments, motor 508 may be displaced (e.g., linearly and/or angularly) from the screw shaft 512A. In some embodiments, the screw 512 is a roller screw (e.g., the planetary roller screw 680 shown in perspective view in FIG. 6J or half sectional view in FIG. 6K). In some embodiments, a roller screw may provide more bearing points or area than a ball screw within a given volume, and may thus lower contact stresses. In some embodiments, a roller screw can be more compact for a given load capacity while providing similar efficiency as ball screws at low to moderate speeds, and maintaining relatively high efficiency at high speeds. In some embodiments, a roller screw may achieve better positioning accuracy, load rating, rigidity, speed, acceleration, and/or lifetime compared to a ball screw. However, a ball screw may be cheaper than a roller screw, and thus it may be desirable to use a ball screw for some applications.

Figures 5C, 5D:
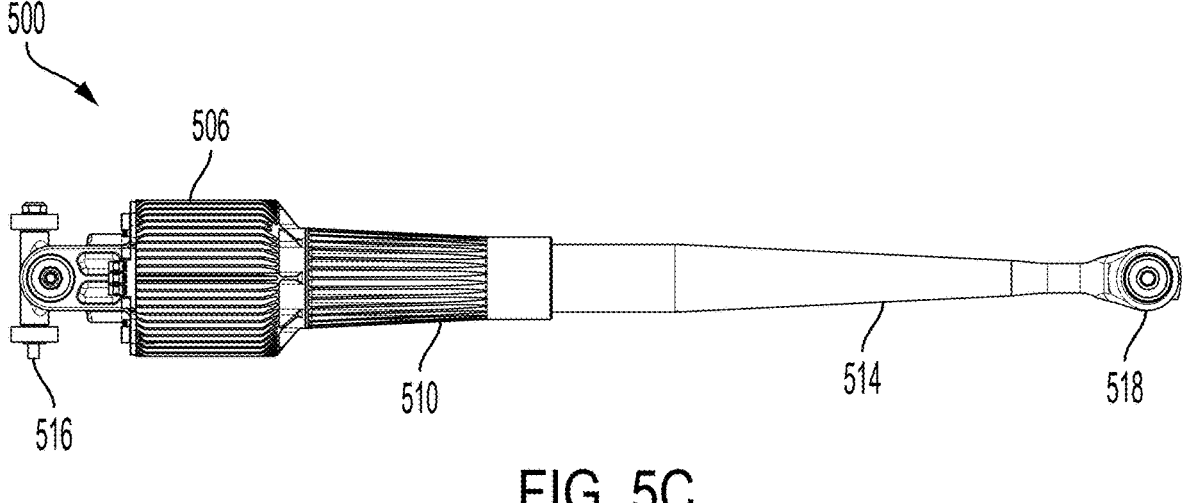
FIG. 5C illustrates a head-on external schematic view of a screw actuator, in accordance with another example implementation.
FIG. 5D illustrates a top-down external view of a screw actuator (i.e., a view in which the screw actuator of FIG. 5C is rotated 90 degrees around its horizontal axis), in accordance with another example implementation.

FIG. 5C illustrates a head-on external schematic view of the screw actuator 500, and FIG. 5D illustrates a top-down external view of the screw actuator 500 (i.e., a view in which the screw actuator of FIG. 5C is rotated 90 degrees around its horizontal axis), in accordance with another example implementation. FIGS. 5C-5D show the two universal joints 516, 518, the motor housing 506 (which in this case is finned, as in FIG. 6C), the first rigid member 510, and the second rigid member 514. In FIG. 5D, an electrical connection 540 is visible, which can provide a connection to the motor 508 and/or encoder 532.

Figure 7A:
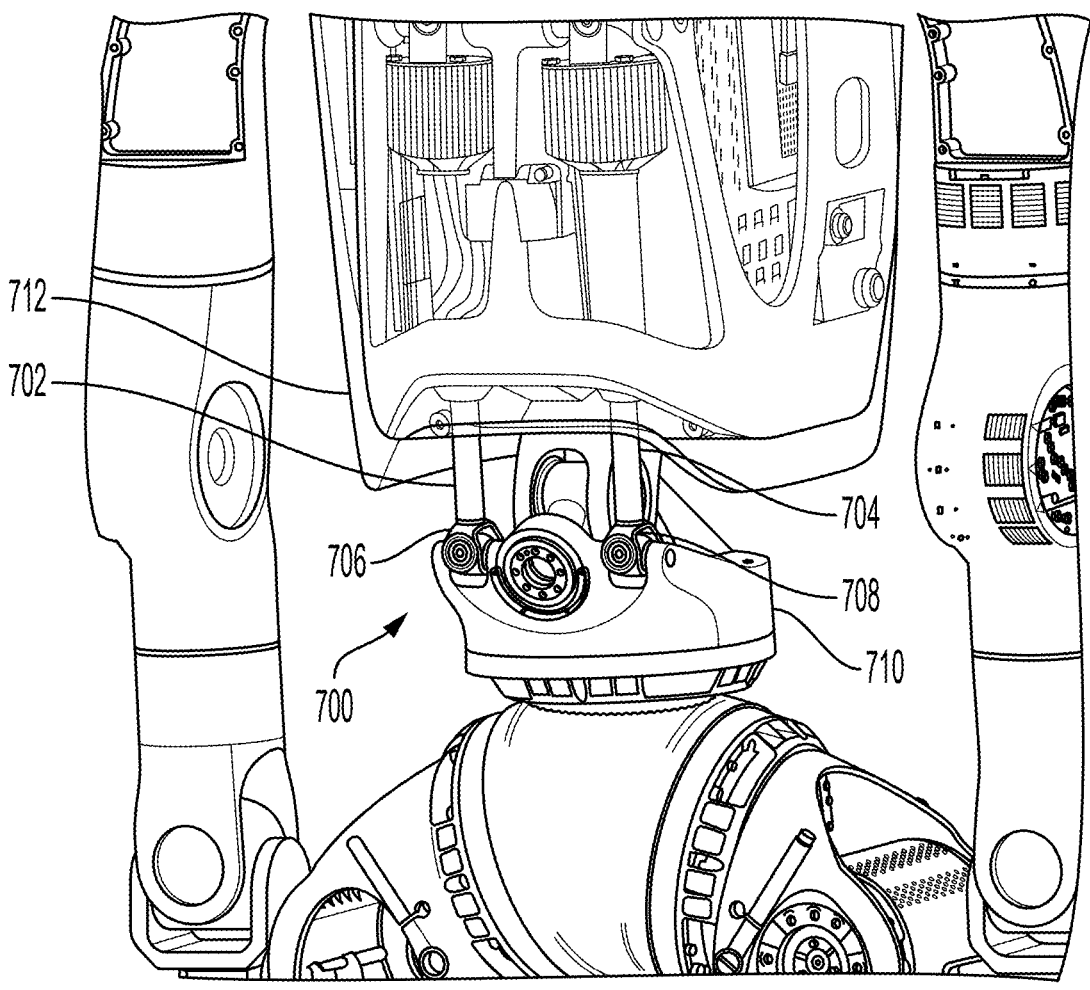
FIG. 7A illustrates a schematic close-up view of a back mechanism for a robot (e.g., the biped robot shown and described in FIG. 4) having two screw actuators, in accordance with another example implementation.

FIG. 7A illustrates a schematic close-up view of a back mechanism 700 included in a biped robot (e.g., the biped robot 400 shown and described in FIG. 4) having two screw actuators 702, 704, in accordance with another example implementation. The screw actuators 702, 704 (e.g., two of the screw actuators 500 shown and described above) are in a "coupled" configuration, which includes a two degree-of-freedom closed-loop mechanism that together drive a pair of rotary joints 706, 708. The rotary joints 706, 708 connect a lower portion 710 of the back mechanism 700 (or "lower back") to an upper portion 712 of the back mechanism 700 (or "upper back") and allow the lower portion 710 to move relative to the upper portion 712 (e.g., tilt forward, backward, and to each side).

Figure 7B:
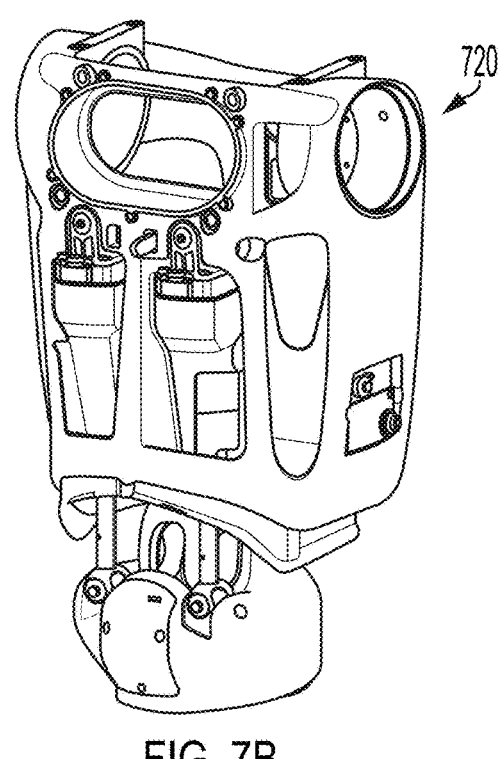
FIGS. 7B-7E illustrate schematic views of a back mechanism for a robot in different poses, in accordance with another example implementation.
Figure 7C:
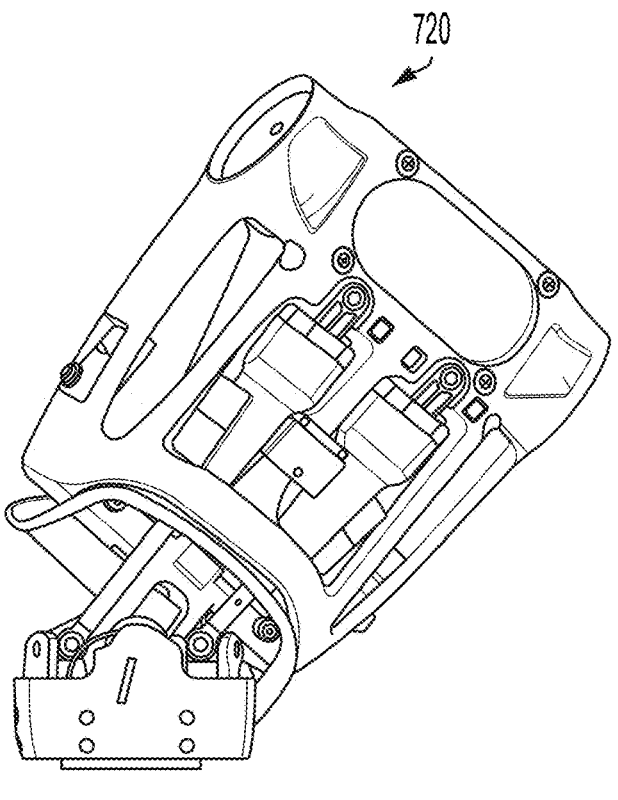
Figure 7D:
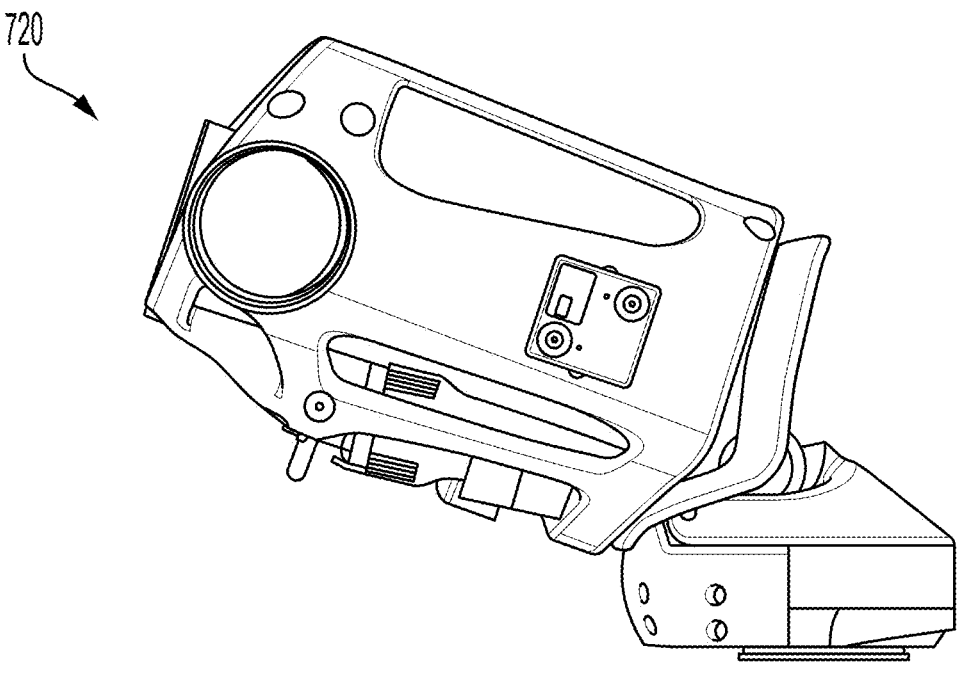
Figure 7E:
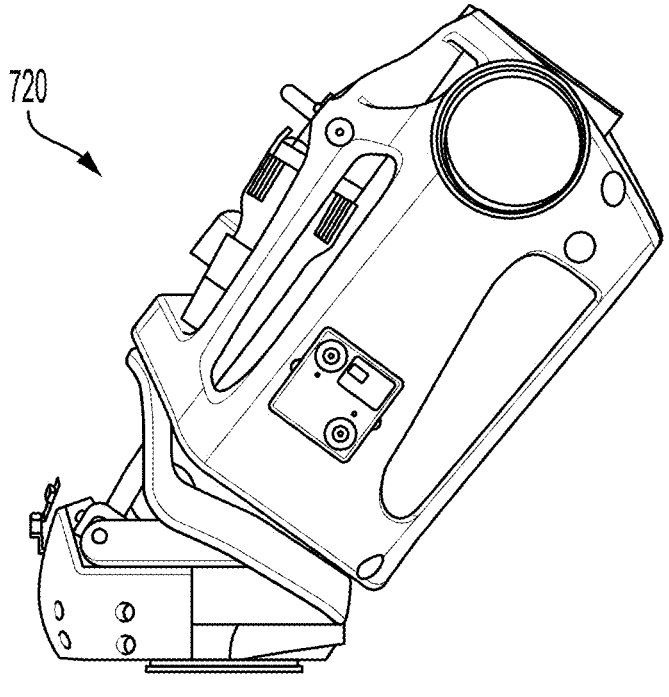

FIGS. 7B-7E illustrate the large range of motion made possible by such a configuration. FIG. 7B illustrates a back mechanism 720 in an upright position (with other robot components, e.g., arms and legs, not rendered to reduce visual clutter). FIG. 7C illustrates the back mechanism 720 tilted to the left side (although the back mechanism 720 can also tilt to the right side). In some embodiments, the back mechanism 720 can tilt at least 40 degrees to the left and/or right. FIG. 7D illustrates the back mechanism 720 tilted forward. In some embodiments, the back mechanism 720 can tilt at least 70 degrees forward. FIG. 7E illustrates the back mechanism 720 tilted backward. In some embodiments, the back mechanism 720 can tilt at least 35 degrees backward. Although FIGS. 7B-7E illustrate several poses demonstrating the range of motion enabled by the back mechanism 720, one having ordinary skill in the art will readily appreciate that a variety of additional poses are also possible with the same apparatus (e.g., those combining one or more of the components of tilt shown and described above).

The configuration shown in FIGS. 7A-7E is capable of generating a large force with respect to its size and/or weight and can achieve multiple benefits by comparison to prior configurations. First, the weight of the actuators for certain joints of the robots can be reduced, which in turn can reduce the distal mass of the limbs and/or increase the robot's capability to propel itself to realize motions such as running or jumping. Second, the physical volume of the back mechanism can be lowered, which can be important due to the space constraints imposed by the number of actuators, limbs, and/or other mechanisms included in the robot. Third, the torque capability at the joints 706, 708 can be increased by driving them with a pair of actuators that work cooperatively. Fourth, the screw transmission can provide a substantial mechanical advantage (e.g., 70:1) within a single stage and a small form factor, enabling a smaller and/or lighter motor to be used. Fifth, using universal joints with an offset between the two degrees of freedom can increase the range of motion of the back mechanism.

Figure 8A:
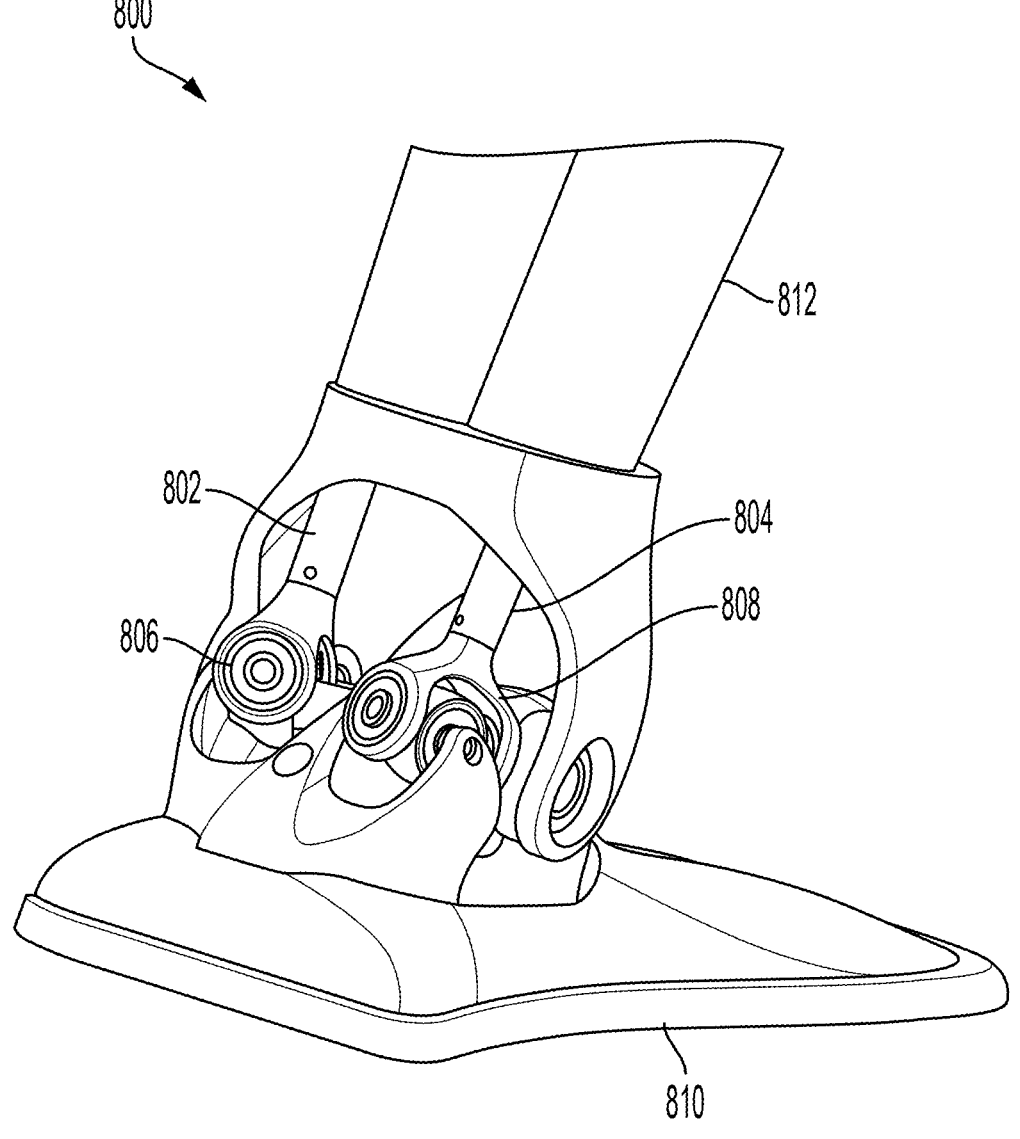
FIG. 8A illustrates a schematic close-up view of an ankle mechanism for a robot (e.g., the biped robot shown and described in FIG. 4) having two screw actuators, in accordance with another example implementation.

FIG. 8A illustrates a schematic close-up view of an ankle mechanism 800 included in a biped robot (e.g., the biped robot 400 shown and described in FIG. 4) having two screw actuators, in accordance with another example implementation. The ankle mechanism 800 is similar to the back mechanism 700 shown and described above in FIGS. 7A-7E, e.g., it is also a coupled linear actuator having two screw actuators 802, 804, which drive a pair of rotary joints 806, 808. In the case of the ankle mechanism 800, the rotary joints 806, 808 connect a foot 810 to a lower leg 812 and allow the foot 810 to move relative to the lower leg 812 (e.g., tilt forward, backward, and to each side).

Figures 8B, 8C, 8D, 8E, 8F:
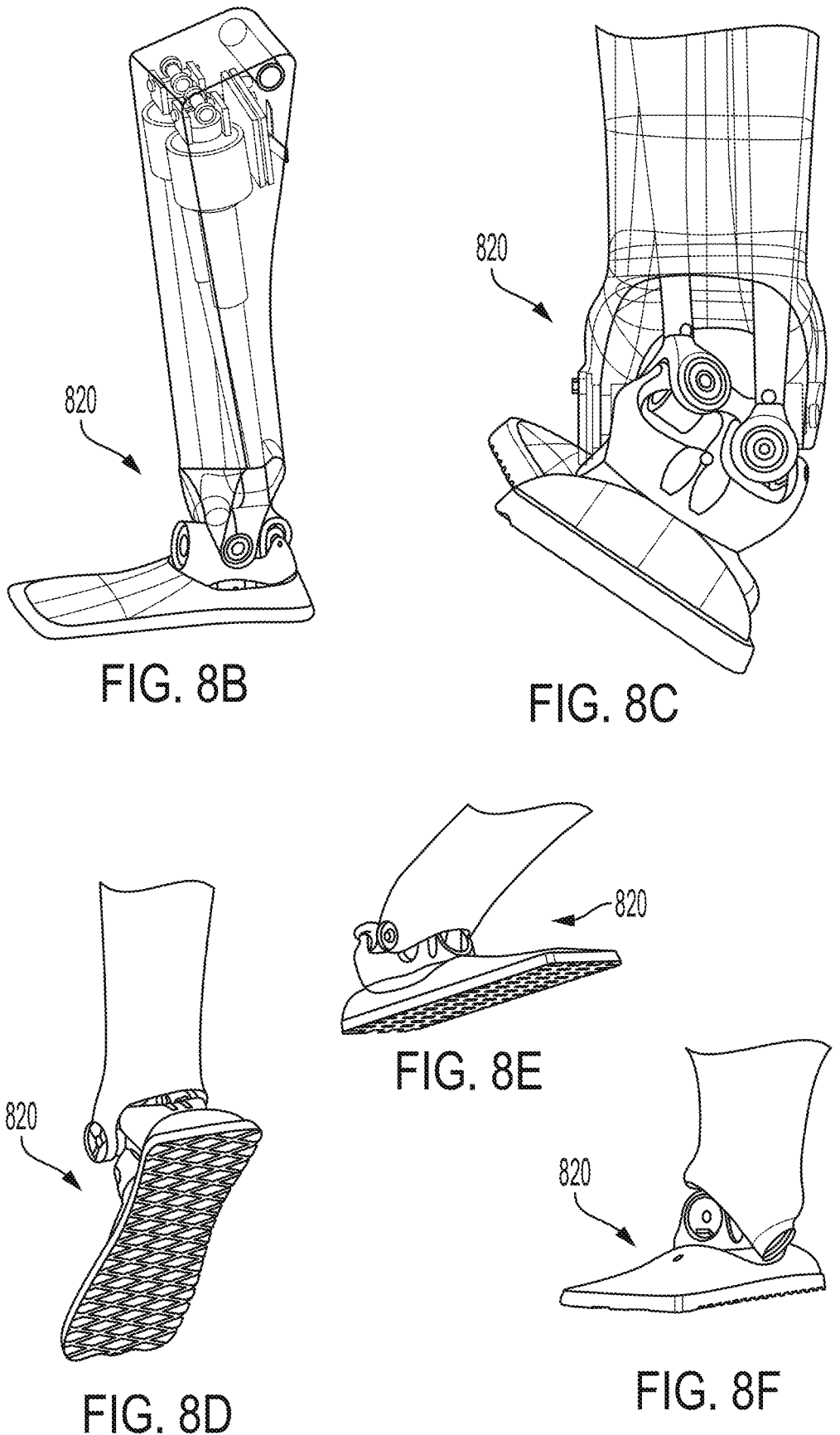
FIGS. 8B-8F illustrate schematic views of an ankle mechanism for a robot in different poses, in accordance with another example implementation.

However, the ankle mechanism 800 can be different in one or more ways from the back mechanism 700. In some embodiments, the differences may be informed according to the torque and/or range of motion needed for the corresponding joints and the space constraints for the mechanism (e.g., the back joint may require more torque than the ankle joint but may not be too space constrained, whereas the opposite may be true for the ankle joint). In some embodiments, the ankle mechanism 800 and the back mechanism 700 may have different lengths, anchoring locations and/or directions. For example, the ankle mechanism 800 can utilize canted axes, e.g., to increase compactness and/or maintain a large range of motion. (In addition, the ankle mechanism 800 can utilize different component parts for the screw actuators, e.g., as shown and described below in FIGS. 9A-9B). FIGS. 8B-8F illustrate examples of the range of motion made possible with the screw actuator configurations described herein. FIG. 8B shows an ankle mechanism 820 configured so that the corresponding foot is angled somewhat less than 90 degrees with respect to the lower leg (e.g., corresponding to a robot standing upright in a resting position). FIG. 8C shows the ankle mechanism 820 tilting the right side of the ankle downward. FIG. 8D shows the ankle mechanism 820 tilting the entire foot downward relative to the lower leg. FIG. 8E shows the ankle mechanism 820 tilting the entire foot upward relative to the lower leg. FIG. 8F shows the ankle mechanism 820 tilting the foot upward and to the left.

The ankle mechanism 800 shown and described above can achieve some or all of the advantages described above with respect to the back mechanism 700, and in some cases, additional advantages. For example, the ankle mechanism 800 can reduce a distal mass of the legs of the robot because the motors used to control the joint can be placed closer to the body (e.g., at the hip) of the robot rather than at the ankle joint. In such a configuration, the telescoping action of the transmission can enable the motors to be placed proximally to the body, reducing the moving inertia of the associated limb. In addition, the joints 806, 808 can allow the foot 810 to pronate, supinate, dorsiflex, and/or plantar flex with respect to the lower leg 812. In some embodiments, the pair of screw actuators can work cooperatively to satisfy the large torque requirements needed during some operations of the robot (e.g., for athletic activities). In some embodiments, a similar mechanism can be used in other situations that require distal actuation and/or have significant weight and/or size constraints. For example, a similar mechanism could be used in a wrist joint of an industrial robot manipulator and/or on an active base of a mobile robot to shift the weight of the motor actuating the joints of a manipulator arm closer to the active base.

Figures 9A, 9B:
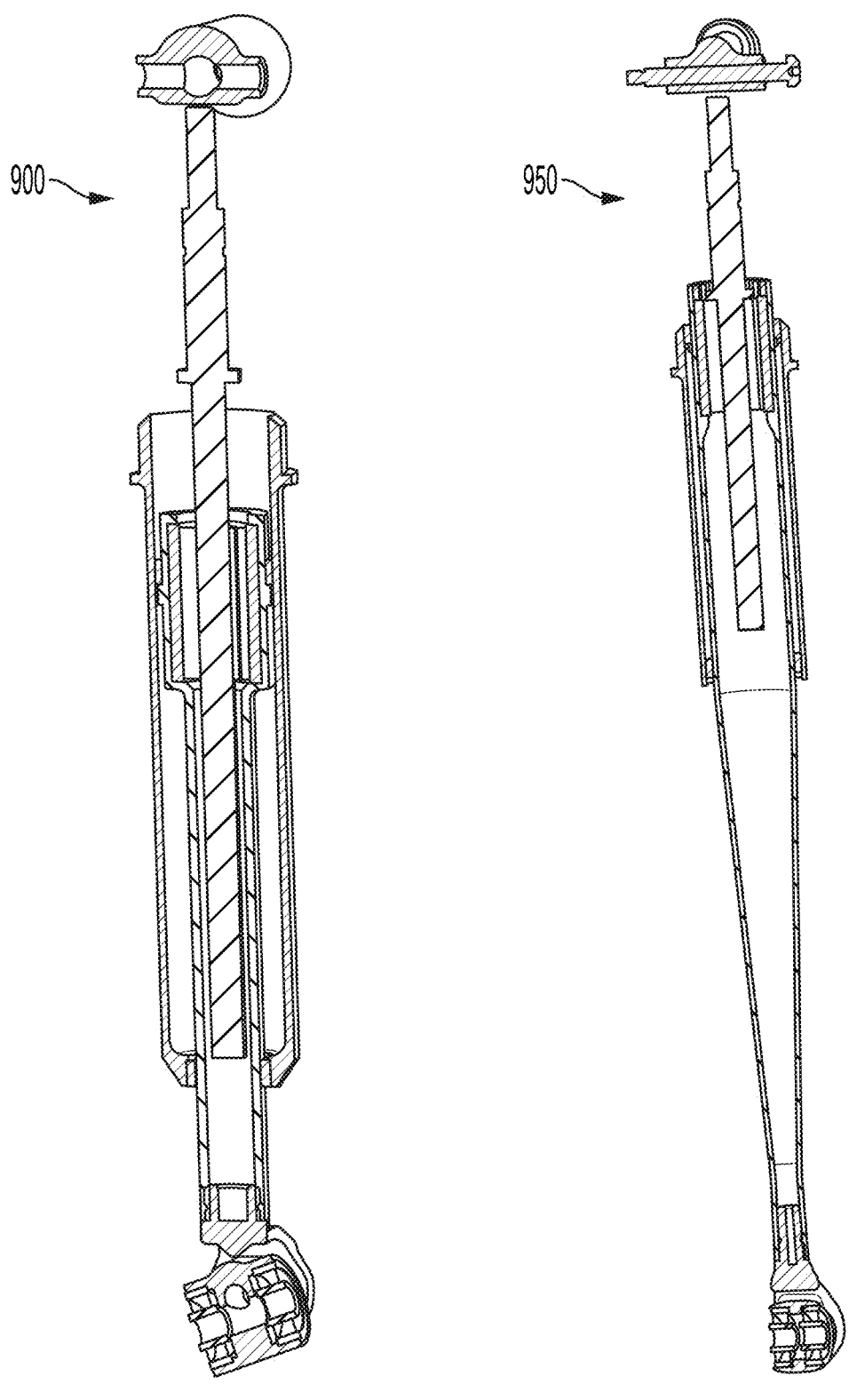
FIG. 9A illustrates a half sectional view of a back attachment for a screw actuator for a back mechanism, in accordance with another example implementation.
FIG. 9B illustrates a half sectional view of an ankle attachment for a screw actuator for an ankle mechanism, in accordance with another example implementation.

FIG. 9A illustrates a half sectional view of a back attachment 900 for a screw actuator for a back mechanism, in accordance with another example implementation. FIG. 9B illustrates a half sectional view of an ankle attachment 950 for a screw actuator for an ankle mechanism, in accordance with another example implementation. The ankle attachment 950, in combination with the motor assembly components shown and described above in FIGS. 5A-5D, comprise the screw actuator 500. The back attachment 900 can be combined with similar motor assembly components to comprise a similar screw actuator that differs in certain respects (e.g., in dimensions, which can be driven by different packaging requirements demanded by the back and the ankle mechanisms). In some embodiments, the back attachment 900 includes a narrow diameter for the second rigid member (e.g., the piston) to clear an adjacent structure and/or a minimum actuator length at full compression. In some embodiments, the ankle attachment 950 can allow the actuator to span a longer length in order to locate a center of mass of the actuator as proximally as possible. In some embodiments, the ankle attachment 950 can require a comparatively small distal universal joint in order to achieve a suitable range-of-motion and/or structural requirements.

In some embodiments, in order to realize athletic (e.g., fast and/or forceful) motions, a robot (e.g., a humanoid robot) must be capable of both (1) generating contact forces that are large with respect to the robot's total body mass (e.g., so the robot can jump high off the ground); and (2) rapidly accelerating and/or retracting its limbs (e.g., during running and/or experiencing impacts with the environment). In some embodiments, one or both of these goals are served by increasing (e.g., maximizing) a force density of the actuator. In some embodiments, the force density corresponds to a peak actuator force per unit actuator mass. In some embodiments, the force density is at least 10 kN/kg (e.g., approximately 11 kN/kg). In some embodiments, a peak force (e.g., that the first rigid member can actively generate) is maximized (e.g., to expand and/or contract) while minimizing a total mass and/or volume of the screw actuator.

In some embodiments, optimizing for these parameters is served by maximizing a peak torque that the motor can produce for a given mass. In some embodiments, a screw actuator's ability to accelerate its first rigid member when expanding and/or contracting (e.g., with peak force and/or no load) is maximized. In some embodiments, this goal is served by minimizing a rotary inertia of the rotor of the motor. In some embodiments, the actuator has an acceleration capability given in m/s$^2$ (e.g., a peak actuator force per unit rotor inertia expressed in linear motion). In some embodiments, the screw actuator has an acceleration capability of at least 200 m/s$^2$ (e.g., approximately 230 m/s$^2$).

In some embodiments, the screw actuator maximizes both (i) the peak force that the screw actuator (e.g., the first rigid member) can actively generate, and (ii) the ability of the screw actuator to accelerate (e.g., the second rigid member) when expanding and/or contracting with peak force and no load. In contrast, previous actuator designs typically maximize one metric at the expense of the other. For example, a pitch of the screw can be decreased to improve the actuator force, but at the cost of decreasing its acceleration capability. As another example, a pitch of the screw can be increased to enhance the actuator acceleration capability, but at the cost of reducing its force density.

In some embodiments, one or more of the following design features and/or principles can help to maximize both (i) and (ii) above (i.e., the peak force that the screw actuator can actively generate, and the ability of the screw actuator to accelerate when expanding and/or contracting with peak force and no load). First, motors can be custom-designed to maximize the peak torque they can produce for a given rotor inertia. Second, the rotor of the motor can be made of a low-inertia material (e.g., fiberglass). Third, the universal joint used (e.g., one manufactured in accordance with the methods shown and described herein) can allow the strength of the parts used to be increased (and/or small bearings with high load ratings to be used). Fourth, using universal joints to bear torsional loads can enable a number of parts and/or overall complexity of the screw actuator to be reduced. Fifth, using a planetary rotor screw can allow a smaller mass and/or form factor than other solutions (e.g., ball screws with similar load ratings) and substantially lower friction than other solutions (e.g., lead screws with similar load ratings).

Figures 10A, 10B, 10C:
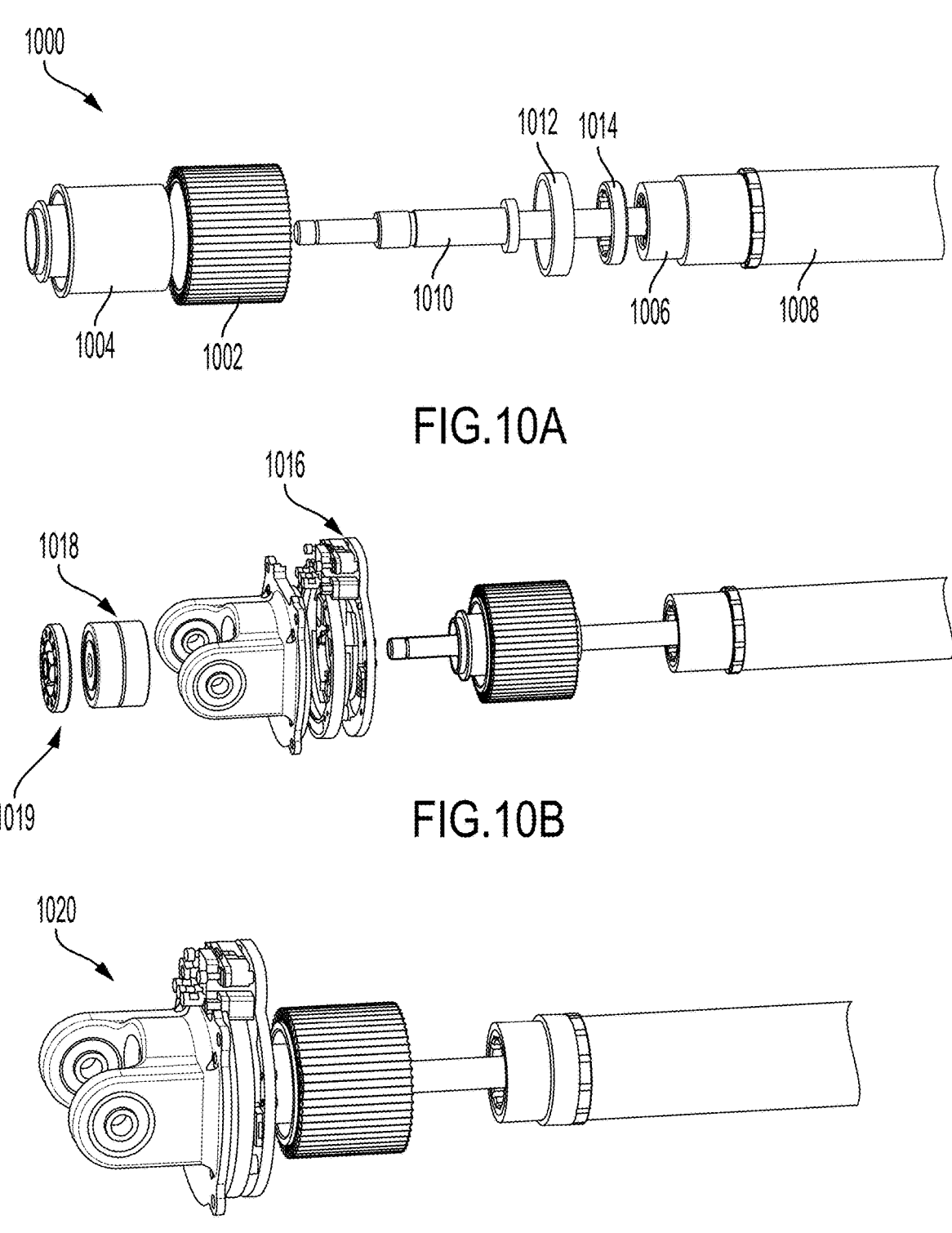
FIGS. 10A-10F illustrate steps in manufacturing the ankle attachment shown in FIG. 9B, in accordance with another example implementation.

FIGS. 10A-10F illustrate steps in manufacturing the screw actuator for the ankle attachment 950 shown in FIG. 9B, in accordance with another example implementation. In FIG. 10A, a magnet ring 1002 is affixed (e.g., bonded) to a rotor hub 1004. A screw nut (e.g., a roller screw nut) 1006 is fastened to a piston 1008. The rotor hub 1004 is pressed onto a shaft of the screw (e.g., a roller screw shaft) 1010. In some embodiments, a bearing 1012 (e.g., a guide bushing) can be aligned to the piston 1008. In some embodiments, a lock ring 1014 can retain the roller screw nut 1006 to the piston 1008. In FIG. 10B, a board stack 1016 (which may include, e.g., a rotor encoder and/or an interface PCB as described herein), a thrust bearing 1018, and a lock ring 1019) are assembled. The rotor and screw assembly 1000 shown in FIG. 10A is inserted through the board stack 1016. In FIG. 10C, the finished rotor and screw assembly 1020 is shown.

Figure 10D:
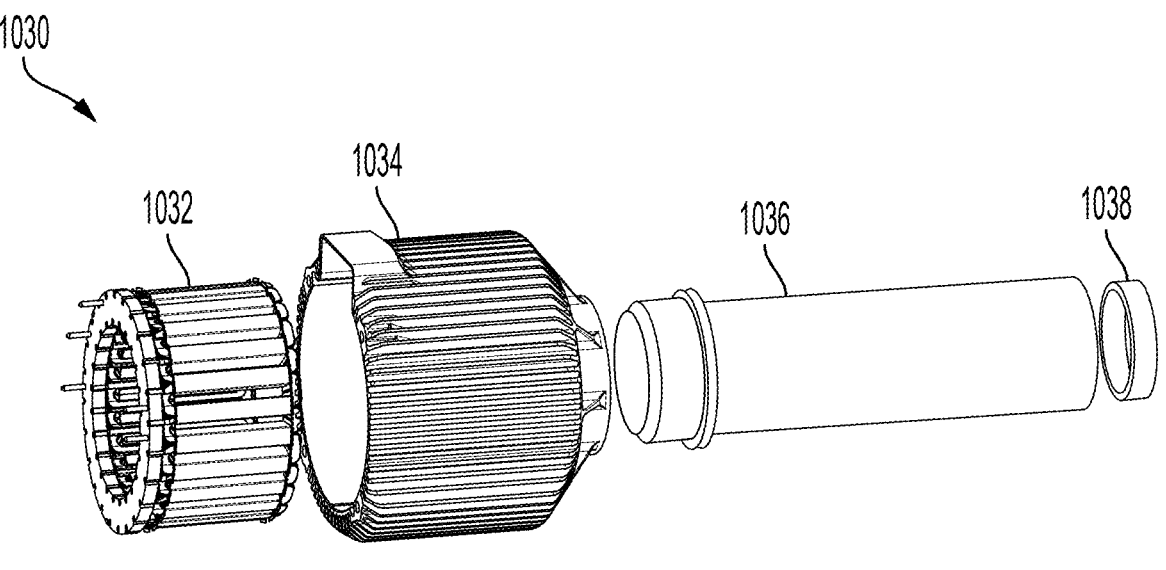
Figures 10E, 10F:
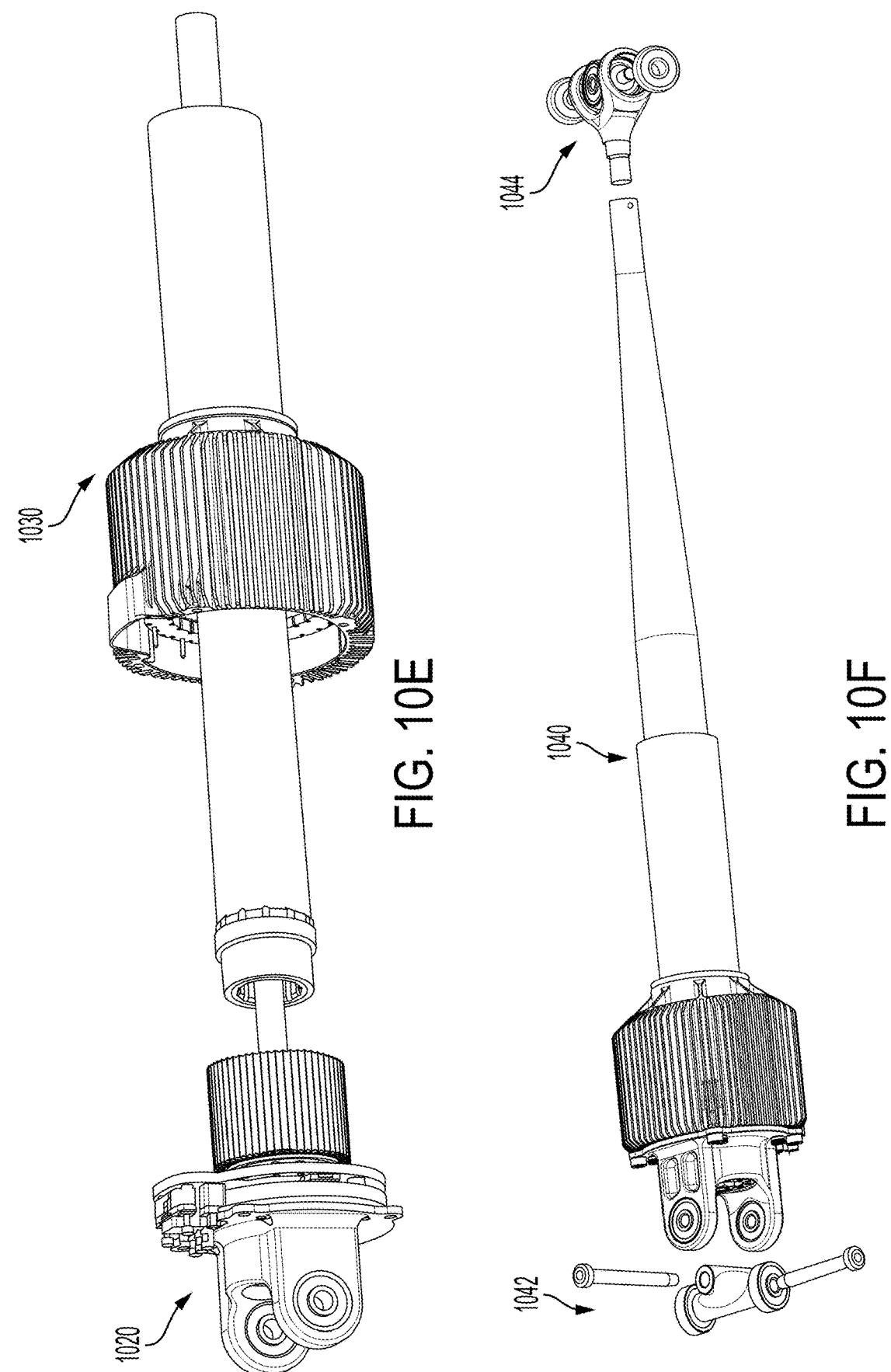
Figure 10L:
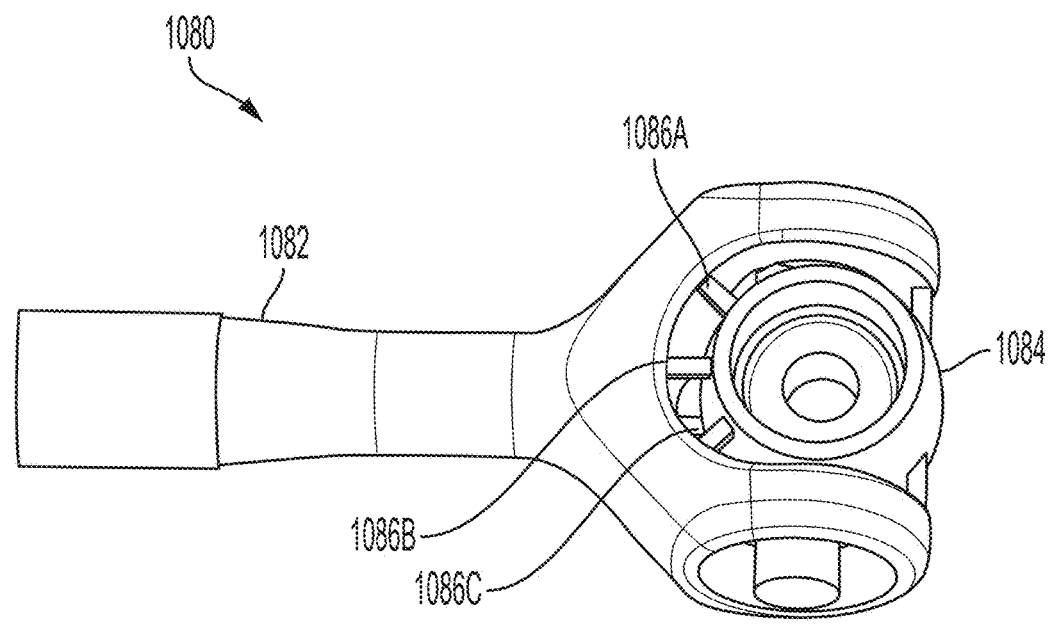
FIGS. 10G-10H illustrate steps in manufacturing a universal joint, in accordance with another example implementation.
Figure 10M:
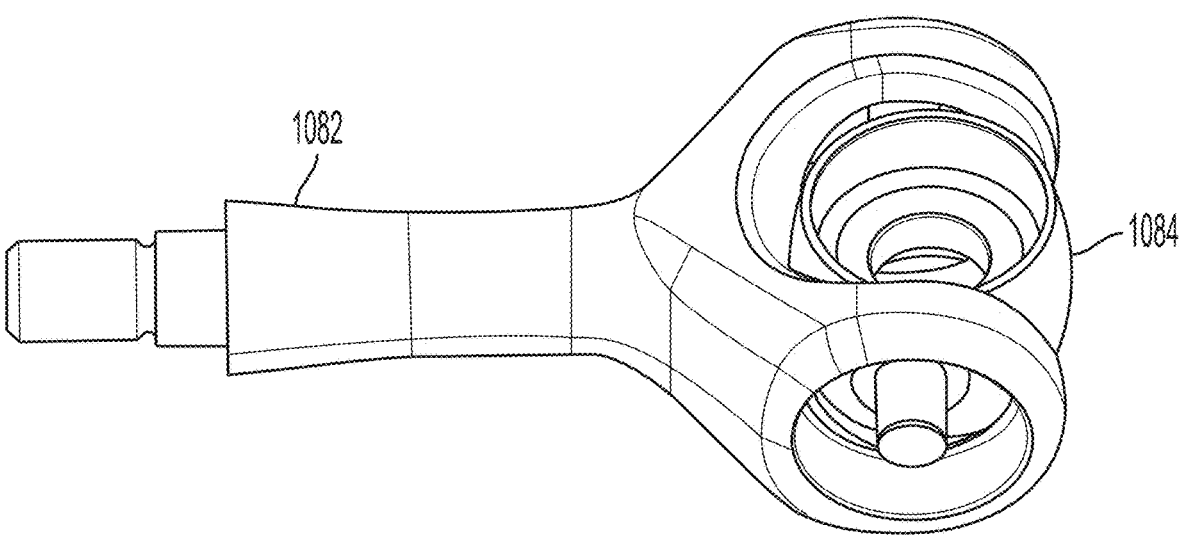

In FIG. 10D, a stator assembly 1030 is created by affixing (e.g., potting) a stator 1032 into a motor housing 1034. A cylinder 1036 is installed (e.g., press fit) into the motor housing 1034. In some embodiments, a bearing 1038 is aligned within the cylinder 1036 to guide the piston 1008 within the cylinder 1036 during assembly and/or operation. In FIG. 10E, the finished rotor and screw assembly 1020 of FIG. 10C is assembled into the stator assembly 1030 of FIG. 10D, creating a composite assembly 1040. In this step, alignment of the stator 1032 to the finished rotor and screw assembly 1020 is guided by the piston 1008 and/or the bearings 1012, 1038. In FIG. 10F, a proximal universal joint 1042 and a distal universal joint 1044 are installed on proximal and distal ends, respectively, of the composite assembly 1040, completing the screw actuator. A similar method can be used in manufacturing the screw actuator for the back attachment 900 shown in FIG. 9A.

FIGS. 10G-10H illustrate steps in manufacturing a universal joint, in accordance with another example implementation. In a first step, a universal joint component 1080 is formed (e.g., using 3D printing or some other additive manufacturing technique). The universal joint component 1080 has a first section 1082 and a second section 1084 that is joined to the first section 1082 by one or more bridges 1086 (e.g., 1086A, 1086B, 1086C), as shown in FIG. 10G. In some embodiments, the components 1082, 1084, 1086 are made of the same material (e.g., steel or another metal, metal alloy, or other durable composite material). In a second step, the bridges 1086 are machined out (e.g., via a milling, grinding, sanding, or other similar operation), leaving the first section 1082 mechanically constraining the second section 1084. In some embodiments, manufacturing the universal joint in this manner (as opposed to a more conventional manner, in which two separate parts would be assembled) allows a size of the universal joint to be minimized, e.g., by eliminating a clearance that would otherwise be required for assembly. In some embodiments, manufacturing the universal joint in this manner reduces the total number of parts used.

Figure 11:
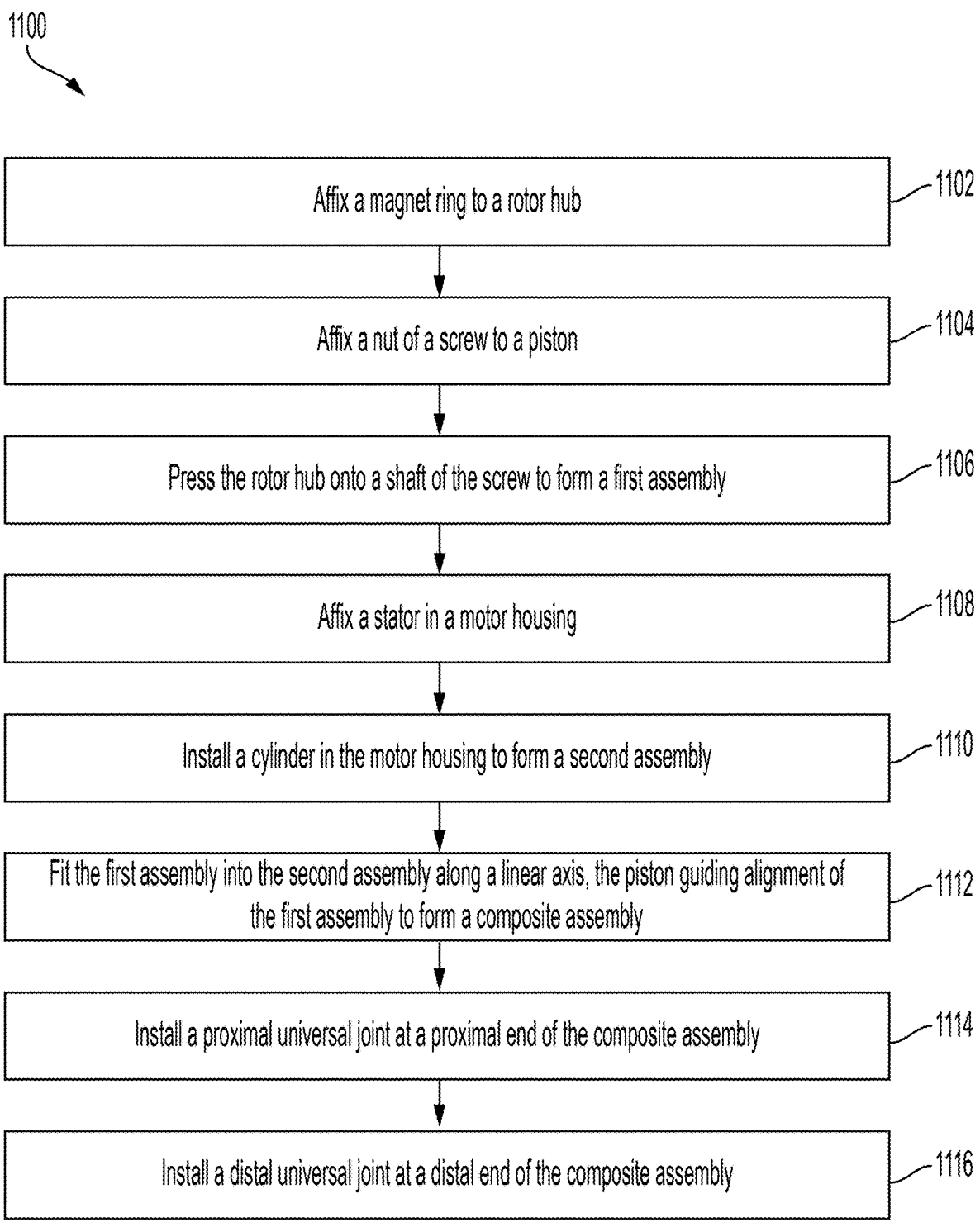
FIG. 11 is a flowchart showing an exemplary method of manufacturing a screw actuator, according to an illustrative embodiment of the invention.

FIG. 11 is a flowchart showing an exemplary method of manufacturing a screw actuator, according to an illustrative embodiment of the invention. In act 1102, a magnet ring is affixed to a rotor hub. In act 1104, a nut of a screw is affixed to a piston. In act 1106, a rotor hub is pressed onto a shaft of the screw to form a first assembly. In act 1108, a stator is affixed in a motor housing. In act 1110, a cylinder is installed in the motor housing to form a second assembly. In act 1112, the first assembly is fitted into the second assembly along a linear axis, the piston guiding alignment of the first assembly to the second assembly to form a composite assembly. In act 1114, a proximal universal joint is installed at a proximal end of the composite assembly. In act 1116, a distal universal joint is installed at a distal end of the composite assembly.

A number of implementations have been described. Nevertheless, it will be understood that various modifications may be made without departing from the spirit and scope of the disclosure.

The invention claimed is:

1. A screw actuator, comprising:
a screw having a shaft and a nut, the shaft defining a first linear axis along its length;
a motor having a stator and a rotor, the rotor mechanically coupled to the shaft and configured to drive the shaft;
a cylinder coupled to the stator, the cylinder having a length dimension oriented along the first linear axis;
a piston at least partially surrounded by the cylinder, the piston configured to move along a direction of the first linear axis;
a set of bearings arranged between the piston and the cylinder, the set of bearings including at least two bearings spaced along the first linear axis, the set of bearings configured to react to a tilting between the piston and the cylinder when the screw actuator is under compression or tension;
a first universal joint at a proximal end of the screw actuator; and
a second universal joint at a distal end of the screw actuator.

2. The screw actuator of claim 1, further comprising:
a thrust bearing located adjacent to one of the first universal joint or the second universal joint, the thrust bearing configured to support an axial load on the screw and/or constrain rotation of the screw.

3. The screw actuator of claim 1, wherein the screw comprises a planetary roller screw.

4. The screw actuator of claim 1, wherein the rotor is formed of fiberglass.

5. The screw actuator of claim 1, wherein the set of bearings includes a guide bushing in mechanical contact with an inner circumferential surface of the cylinder and an outer circumferential surface of the piston.

6. The screw actuator of claim 1, wherein the nut is fixed with respect to the piston.

7. The screw actuator of claim 1, wherein the first universal joint comprises a first roller bearing.

8. The screw actuator of claim 7, wherein the second universal joint comprises a second roller bearing.

9. The screw actuator of claim 1, wherein the first universal joint and/or the second universal joint is configured to tilt at least 30 degrees.

10. The screw actuator of claim 1, wherein the first universal joint and/or the second universal joint is configured to tilt at least 45 degrees.

11. The screw actuator of claim 1, wherein the piston is configured to reciprocate telescopically with respect to the cylinder.

12. The screw actuator of claim 1, further comprising a rotor encoder located adjacent to the motor.

13. The screw actuator of claim 12, wherein the rotor encoder is arranged coaxially with the motor.

14. The screw actuator of claim 1, wherein the screw actuator is configured to actuate a joint having at least two degrees of freedom.

15. The screw actuator of claim 1, wherein the rotor is mechanically coupled to the shaft via the nut.

16. The screw actuator of claim 15, wherein the nut is arranged inside of the rotor.

17. The screw actuator of claim 16, wherein the nut is arranged coaxially with the rotor.

18. The screw actuator of claim 1, wherein the piston is configured to freely spin around the first linear axis.

19. A robot, comprising:
a first screw actuator of claim 1;
a second screw actuator of claim 1;
a first robot member mechanically coupled to (i) the first screw actuator at the first universal joint, and (ii) the second screw actuator at a third universal joint; and
a second robot member mechanically coupled to (i) the first screw actuator at the second universal joint, and (ii) the second screw actuator at a fourth universal joint.

20. The robot of claim 19, further comprising:
a third screw actuator of claim 1;
a fourth screw actuator of claim 1;
a third robot member mechanically coupled to (i) the third screw actuator at a fifth universal joint, and (ii) the fourth screw actuator at a sixth universal joint; and
a fourth robot member mechanically coupled to (i) the third screw actuator at a seventh universal joint, and (ii) the fourth screw actuator at an eighth universal joint.

21. The robot of claim 20, wherein the first screw actuator and the second screw actuator form a portion of a back assembly for the robot and the third screw actuator and the fourth screw actuator form a portion of an ankle assembly for the robot.

* * * * *